United States Patent
Kim et al.

(10) Patent No.: US 9,325,400 B2
(45) Date of Patent: Apr. 26, 2016

(54) BEAMFORMING FEEDBACK FRAME FORMATS WITHIN MULTIPLE USER, MULTIPLE ACCESS, AND/OR MIMO WIRELESS COMMUNICATIONS

(71) Applicant: BROADCOM CORPORATION, Irvine, CA (US)

(72) Inventors: Joonsuk Kim, Saratoga, CA (US); Joseph Paul Lauer, Vienna, VA (US); Vinko Erceg, Cardiff by the Sea, CA (US); Peiman Amini, Mountain View, CA (US); Matthew James Fischer, Mountain View, CA (US)

(73) Assignee: BROADCOM CORPORATION, Irvine, CA (US)

( * ) Notice: Subject to any disclaimer, the term of this patent is extended or adjusted under 35 U.S.C. 154(b) by 32 days.

(21) Appl. No.: 14/067,009

(22) Filed: Oct. 30, 2013

(65) Prior Publication Data
US 2014/0050211 A1   Feb. 20, 2014

Related U.S. Application Data

(63) Continuation of application No. 12/856,474, filed on Aug. 13, 2010, now Pat. No. 8,576,804.

(60) Provisional application No. 61/233,643, filed on Aug. 13, 2009.

(51) Int. Cl.
| H04W 4/00 | (2009.01) |
| H04B 7/06 | (2006.01) |
| H04L 1/06 | (2006.01) |
| H04B 7/04 | (2006.01) |

(52) U.S. Cl.
CPC .............. *H04B 7/063* (2013.01); *H04B 7/0617* (2013.01); *H04B 7/0626* (2013.01);
(Continued)

(58) Field of Classification Search
CPC ................... H04L 25/03949; H04L 25/03898; H04L 1/0687; H04W 4/00; H04B 7/0619; H04B 7/216; H04B 7/04; H04B 7/0456
USPC .................................. 370/487, 484, 334, 252
See application file for complete search history.

(56) References Cited

U.S. PATENT DOCUMENTS

| 7,804,800 B2 * | 9/2010 | Li | .................. | H04B 7/0447 370/334 |
| 7,920,533 B2 * | 4/2011 | Koo | .................. | H04B 7/0408 370/310 |

(Continued)

*Primary Examiner* — Ricky Ngo
*Assistant Examiner* — Dewanda Samuel
(74) *Attorney, Agent, or Firm* — Garlick & Markison; Shayne X. Short

(57) ABSTRACT

Beamforming feedback frame formats within multiple user, multiple access, and/or MIMO wireless communications. A transmitting wireless communication device (TX) transmits a sounding frame to one or more receiving wireless communication devices (RXs) using one or more antennae and one or more clusters. Any antenna/cluster combination may be employed in communications between TXs and RXs. The one or more RXs receive/process the sounding frame to determine a type of beamforming feedback frame to be provided to the TX. Any one of a variety of beamforming feedback frame types and a types of information may be contained within a respective beamforming feedback frame including various characteristics of the respective communication channel between the TX and each of the various RXs. A common beamforming feedback frame format may be supported and employed by all such wireless communication devices (e.g., TX and RXs) when performing MU-MIMO operation such as in accordance with IEEE 802.11ac/VHT.

20 Claims, 31 Drawing Sheets

(52) U.S. Cl.
CPC .......... *H04B 7/0645* (2013.01); *H04B 7/0456* (2013.01); *H04B 7/0619* (2013.01); *H04B 7/0634* (2013.01); *H04B 7/0669* (2013.01); *H04L 1/0687* (2013.01); *H04W 4/00* (2013.01)

(56) References Cited

U.S. PATENT DOCUMENTS

| | | | | |
|---|---|---|---|---|
| 8,130,864 B1* | 3/2012 | Lee | ...................... | H04B 7/0417 375/259 |
| 8,140,024 B2* | 3/2012 | Prasad | ................. | H04B 7/0695 370/328 |
| 8,331,255 B2* | 12/2012 | Choi | .................... | H04B 7/0617 370/252 |
| 8,942,306 B2* | 1/2015 | Zhang | ................. | H04B 7/0456 375/260 |
| 2005/0250544 A1* | 11/2005 | Grant et al. | ................ | 455/562.1 |
| 2006/0291544 A1* | 12/2006 | Fischer et al. | ................. | 375/219 |
| 2007/0298742 A1* | 12/2007 | Ketchum et al. | ........... | 455/186.1 |
| 2008/0080635 A1* | 4/2008 | Hugl et al. | ..................... | 375/267 |
| 2009/0080504 A1* | 3/2009 | Li et al. | ......................... | 375/220 |

\* cited by examiner

• communications using any antenna/cluster combination

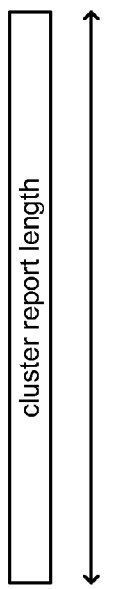
FIG. 17A  beamforming report frame format
FIG. 17B  cluster control field

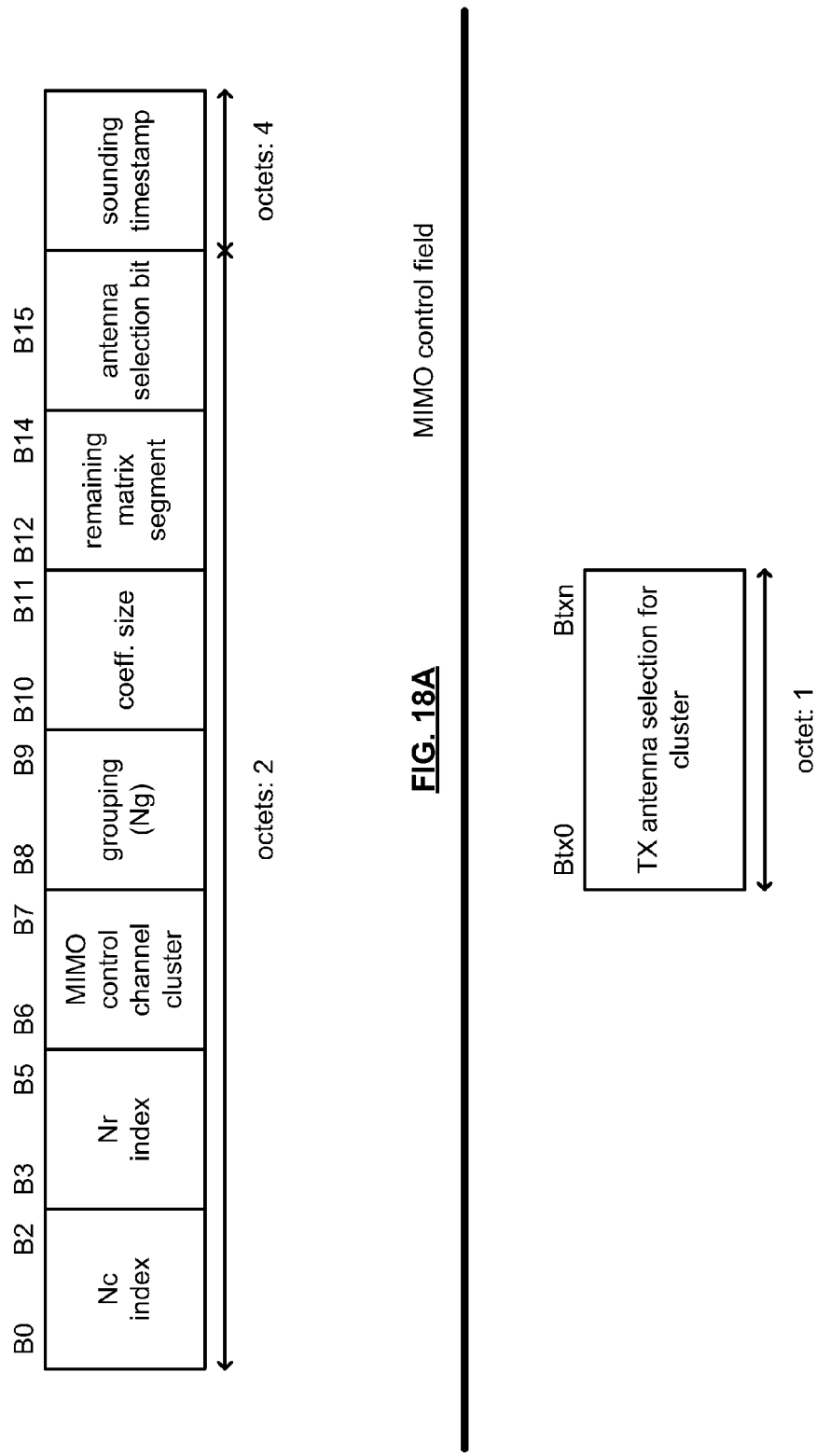

| Subfield | Description |
|---|---|
| Nc Index | Indicates the maximum of the numbers of columns in matrices for all clusters less one |
| Nr Index | Indicates the number of rows in matrices for all clusters less one |
| MIMO Control Channel Cluster | For OFDMA, Indicates the cluster number In which measurement is made<br>Set to 0 for Cluster 1 (lowest carrier)<br>Set to 1 for Cluster 2 (2nd lowest carrier)<br>Set to 2 for Cluster 3 (2nd largest carrier)<br>Set to 3 for Cluster 4 (largest carrier)<br>For channel bonding, Indicates the bandwidth<br>Set to 0 for 20Mhz<br>Set to 1 for 40Mhz<br>Set to 2 for 80Mhz<br>3 is reserved |
| Antenna Selection bit | Set to 1 if antenna selection is chosen<br>0, otherwise. |
| Tx Antenna Selection for the Cluster | Each bit indicates the selection of corresponding Tx antenna. Bit k is for Tx antenna number k+1. |

FIG. 19    subfields of MIMO control field

| Field | Size | Meaning |
|---|---|---|
| SNR in receive chain 1 | 8 bits | Average Signal to Noise Ratio in the STA sending the report for receive chain 1 |
| ... | ... | |
| SNR in receive chain Nr | 8 bits | Average Signal to Noise Ratio in the STA sending the report for receive chain Nr |
| CSI Matrix for carrier -x | 3+2× $Nb \times Nc \times Nr$ bits | CSI Matrix |
| ... | ... | |
| CSI Matrix for carrier -1 | 3+2× $Nb \times Nc \times Nr$ bits | CSI Matrix |
| CSI Matrix for carrier 1 | 3+2× $Nb \times Nc \times Nr$ bits | CSI Matrix |
| ... | ... | |
| CSI Matrix for carrier x | 3+2× $Nb \times Nc \times Nr$ bits | CSI Matrix |

FIG. 20    CSI report field

| Field | Size | Meaning |
|---|---|---|
| CSI Feedback Report for carrier -x | 8 x Nr + 3+2× Nb×Nc×Nr | CSI Feedback Report for carrier -28 |
| ... | ... | ... |
| CSI Feedback Report for carrier -1 | 8 x Nr + 3+2× Nb×Nc×Nr | CSI Feedback Report for carrier -1 |
| CSI Feedback Report for carrier 1 | 8 x Nr + 3+2× Nb×Nc×Nr | CSI Feedback Report for carrier 1 |
| ... | ... | ... |
| CSI Feedback Report for carrier x | 8 x Nr + 3+2× Nb×Nc×Nr | CSI Feedback Report for carrier 28 |

FIG. 21     CSI report field (alternative)

| Field | Size | Meaning |
|---|---|---|
| SNR in receive chain 1 | 8 bits | Signal to Noise Ratio in the STA sending the report for receive chain 1 for carrier k |
| ... | ... | |
| SNR in receive chain Nr | 8 bits | Signal to Noise Ratio in the STA sending the report for receive chain Nr for carrier k |
| CSI Feedback Matrix | $3+2\times Nb \times Nc \times Nr$ | CSI Feedback Matrix for carrier k |

FIG. 22

CSI report field:
beamforming feedback report for tone (carrier) k

| Field | Size | Meaning |
|---|---|---|
| SNR in space-time stream 1 | 8 bits | Average Signal to Noise Ratio in the STA sending the report for space-time stream 1 |
| ... | ... | ... |
| SNR in space-time stream Nc | 8 bits | Average Signal to Noise Ratio in the STA sending the report for space-time stream Nc |
| Beamforming Feedback Matrix V for carrier -x | 2× *Nb*×*Nc*×*Nr* bits | Beamforming Feedback Matrix V |
| ... | ... | ... |
| Beamforming Feedback Matrix V for carrier -1 | 2× *Nb*×*Nc*×*Nr* bits | Beamforming Feedback Matrix V |
| Beamforming Feedback Matrix V for carrier 1 | 2× *Nb*×*Nc*×*Nr* bits | Beamforming Feedback Matrix V |
| ... | ... | ... |
| Beamforming Feedback Matrix V for carrier x | 2× *Nb*×*Nc*×*Nr* bits | Beamforming Feedback Matrix V |

FIG. 23    non-compressed beamforming report field

| Field | Size | Meaning |
|---|---|---|
| Beamforming Feedback Report for carrier -x | 8 × Nc + 2× *Nb×Nc×Nr* bits | Beamforming Feedback Report for carrier -28 |
| ... | ... | ... |
| Beamforming Feedback Report for carrier -1 | 8 × Nc + 2× *Nb×Nc×Nr* bits | Beamforming Feedback Report for carrier -1 |
| Beamforming Feedback Report for carrier 1 | 8 × Nc + 2× *Nb×Nc×Nr* bits | Beamforming Feedback Report for carrier 1 |
| ... | ... | ... |
| Beamforming Feedback Report for carrier x | 8 × Nc + 2× *Nb×Nc×Nr* bits | Beamforming Feedback Report for carrier 28 | non-compressed beamforming report field (alternative)

FIG. 24

| Field | Size | Meaning |
|---|---|---|
| SNR in space-time stream 1 | 8 bits | Signal to Noise Ratio in the STA sending the report for space-time stream 1 for carrier k |
| ... | ... | |
| SNR in space-time stream Nc | 8 bits | Signal to Noise Ratio in the STA sending the report for space-time stream Nc for carrier k |
| Beamforming Feedback Matrix V | 2× *Nb*×*Nc*×*Nr* bits | Beamforming Feedback Matrix V for carrier k |

FIG. 25 non-compressed beamforming report field:
beamforming feedback report for tone (carrier) k

| Field | Size | Meaning |
| --- | --- | --- |
| SNR in space-time stream 1 | 8 bits | Average Signal to Noise Ratio in the STA sending the report for space-time stream 1 |
| ... | ... | ... |
| SNR in space-time stream Nc | 8 bits | Average Signal to Noise Ratio in the STA sending the report for space-time stream Nc |
| Beamforming Feedback Matrix V for carrier -x | $N_a \times (b_\psi + b_\phi)/2$ | Beamforming Feedback Matrix V |
| ... | ... | ... |
| Beamforming Feedback Matrix V for carrier -1 | $N_a \times (b_\psi + b_\phi)/2$ | Beamforming Feedback Matrix V |
| Beamforming Feedback Matrix V for carrier 1 | $N_a \times (b_\psi + b_\phi)/2$ | Beamforming Feedback Matrix V |
| ... | ... | ... |
| Beamforming Feedback Matrix V for carrier x | $N_a \times (b_\psi + b_\phi)/2$ | Beamforming Feedback Matrix V |

FIG. 26  compressed beamforming report field

| Field | Size | Meaning |
|---|---|---|
| Beamforming Feedback Report for carrier -x | 8 x Nc + Na x (b_ψ + b_φ)/2 | Beamforming Feedback Report for carrier -28 |
| ... | ... | ... |
| Beamforming Feedback Report for carrier -1 | 8 x Nc + Na x (b_ψ + b_φ)/2 | Beamforming Feedback Report for carrier -1 |
| Beamforming Feedback Report for carrier 1 | 8 x Nc + Na x (b_ψ + b_φ)/2 | Beamforming Feedback Report for carrier 1 |
| ... | ... | ... |
| Beamforming Feedback Report for carrier x | 8 x Nc + Na x (b_ψ + b_φ)/2 | Beamforming Feedback Report for carrier 28 |

FIG. 27 compressed beamforming report field (alternative)

| Field | Size | Meaning |
|---|---|---|
| SNR in space-time stream 1 | 8 bits | Signal to Noise Ratio in the STA sending the report for space-time stream 1 for carrier k |
| ... | ... | |
| SNR in space-time stream Nc | 8 bits | Signal to Noise Ratio in the STA sending the report for space-time stream Nc for carrier k |
| Beamforming Feedback Matrix V | Na x (b$_\psi$ + b$_\phi$)/2 | Beamforming Feedback Matrix V for carrier k | compressed beamforming report field:
beamforming feedback report for tone (carrier) k

FIG. 28

| Size of V (Nr x Nc) | Number of angles (Na) | The order of angles in the quantized beamforming matrices feedback information field |
|---|---|---|
| 6 x 1 | 10 | $\phi 11, \phi 21, ..., \phi 51, \psi 21, \psi 31, ..., \psi 61$ |
| 6 x 2 | 18 | $\phi 11, \phi 21, ..., \phi 51, \psi 21, \psi 31, ..., \psi 61, \phi 22, \phi 32, ..., \phi 52, \psi 32, \psi 42, ..., \psi 62$ |
| 6 x 3 | 24 | $\phi 11, \phi 21, ..., \phi 51, \psi 21, \psi 31, ..., \psi 61, \phi 22, \phi 32, ..., \phi 52, \psi 32, \psi 42, ..., \psi 62,$ $\phi 33, \phi 43, \phi 53, \psi 43, \psi 53, \psi 63$ |
| 6 x 4 | 28 | $\phi 11, \phi 21, ..., \phi 51, \psi 21, \psi 31, ..., \psi 61, \phi 22, \phi 32, ..., \phi 52, \psi 32, \psi 42, ..., \psi 62,$ $\phi 33, \phi 43, \phi 53, \psi 43, \psi 53, \psi 63, \phi 44, \phi 54, \psi 54, \psi 64$ |
| 6 x 5 | 30 | $\phi 11, \phi 21, ..., \phi 51, \psi 21, \psi 31, ..., \psi 61, \phi 22, \phi 32, ..., \phi 52, \psi 32, \psi 42, ..., \psi 62,$ $\phi 33, \phi 43, \phi 53, \psi 43, \psi 53, \psi 63, \phi 44, \phi 54, \psi 54, \psi 64, \phi 55, \psi 65$ |
| 6 x 6 | 30 | $\phi 11, \phi 21, ..., \phi 51, \psi 21, \psi 31, ..., \psi 61, \phi 22, \phi 32, ..., \phi 52, \psi 32, \psi 42, ..., \psi 62,$ $\phi 33, \phi 43, \phi 53, \psi 43, \psi 53, \psi 63, \phi 44, \phi 54, \psi 54, \psi 64, \phi 55, \psi 65$ |

FIG. 29 order of angles
(compressed beamforming matrix field:Nr=6)

| Size of V (Nr x Nc) | Number of angles (Na) | The order of angles in the quantized beamforming matrices feedback information field |
|---|---|---|
| 8 x 1 | 14 | $\phi 11, \phi 21, ..., \phi 71, \psi 21, \psi 31, ..., \psi 81$ |
| 8 x 2 | 26 | $\phi 11, \phi 21, ..., \phi 71, \psi 21, \psi 31, ..., \psi 81, \phi 22, \phi 32, ..., \phi 72, \psi 32, \psi 42, ..., \psi 82$ |
| 8 x 3 | 36 | $\phi 11, \phi 21, ..., \phi 71, \psi 21, \psi 31, ..., \psi 81, \phi 22, \phi 32, ..., \phi 72, \psi 32, \psi 42, ..., \psi 82,$ $\phi 33, \phi 43, ..., \phi 73, \psi 43, \psi 53, ..., \psi 83$ |
| 8 x 4 | 44 | $\phi 11, \phi 21, ..., \phi 71, \psi 21, \psi 31, ..., \psi 81, \phi 22, \phi 32, ..., \phi 72, \psi 32, \psi 42, ..., \psi 82,$ $\phi 33, \phi 43, ..., \phi 73, \psi 43, \psi 53, ..., \psi 83, \phi 44, \phi 54, ..., \phi 74, \psi 54, \psi 64, ..., \psi 84$ |
| 8 x 5 | 50 | $\phi 11, \phi 21, ..., \phi 71, \psi 21, \psi 31, ..., \psi 81, \phi 22, \phi 32, ..., \phi 72, \psi 32, \psi 42, ..., \psi 82,$ $\phi 33, \phi 43, ..., \phi 73, \psi 43, \psi 53, ..., \psi 83, \phi 44, \phi 54, ..., \phi 74, \psi 54, \psi 64, ..., \psi 84,$ $\phi 55, \phi 65, \psi 75, \psi 65, \psi 75, \psi 85$ |
| 8 x 6 | 54 | $\phi 11, \phi 21, ..., \phi 71, \psi 21, \psi 31, ..., \psi 81, \phi 22, \phi 32, ..., \phi 72, \psi 32, \psi 42, ..., \psi 82,$ $\phi 33, \phi 43, ..., \phi 73, \psi 43, \psi 53, ..., \psi 83, \phi 44, \phi 54, ..., \phi 74, \psi 54, \psi 64, ..., \psi 84,$ $\phi 55, \phi 65, \phi 75, \psi 65, \psi 75, \psi 85, \phi 66, \phi 76, \psi 76, \psi 86$ |
| 8 x 7 | 56 | $\phi 11, \phi 21, ..., \phi 71, \psi 21, \psi 31, ..., \psi 81, \phi 22, \phi 32, ..., \phi 72, \psi 32, \psi 42, ..., \psi 82,$ $\phi 33, \phi 43, ..., \phi 73, \psi 43, \psi 53, ..., \psi 83, \phi 44, \phi 54, ..., \phi 74, \psi 54, \psi 64, ..., \psi 84,$ $\phi 55, \phi 65, \phi 75, \psi 65, \psi 75, \psi 85, \phi 66, \phi 76, \psi 76, \psi 86, \phi 77, \psi 87$ |
| 8 x 8 | 56 | Same with 8x7 case | order of angles
(compressed beamforming matrix field: Nr=8)

FIG. 30

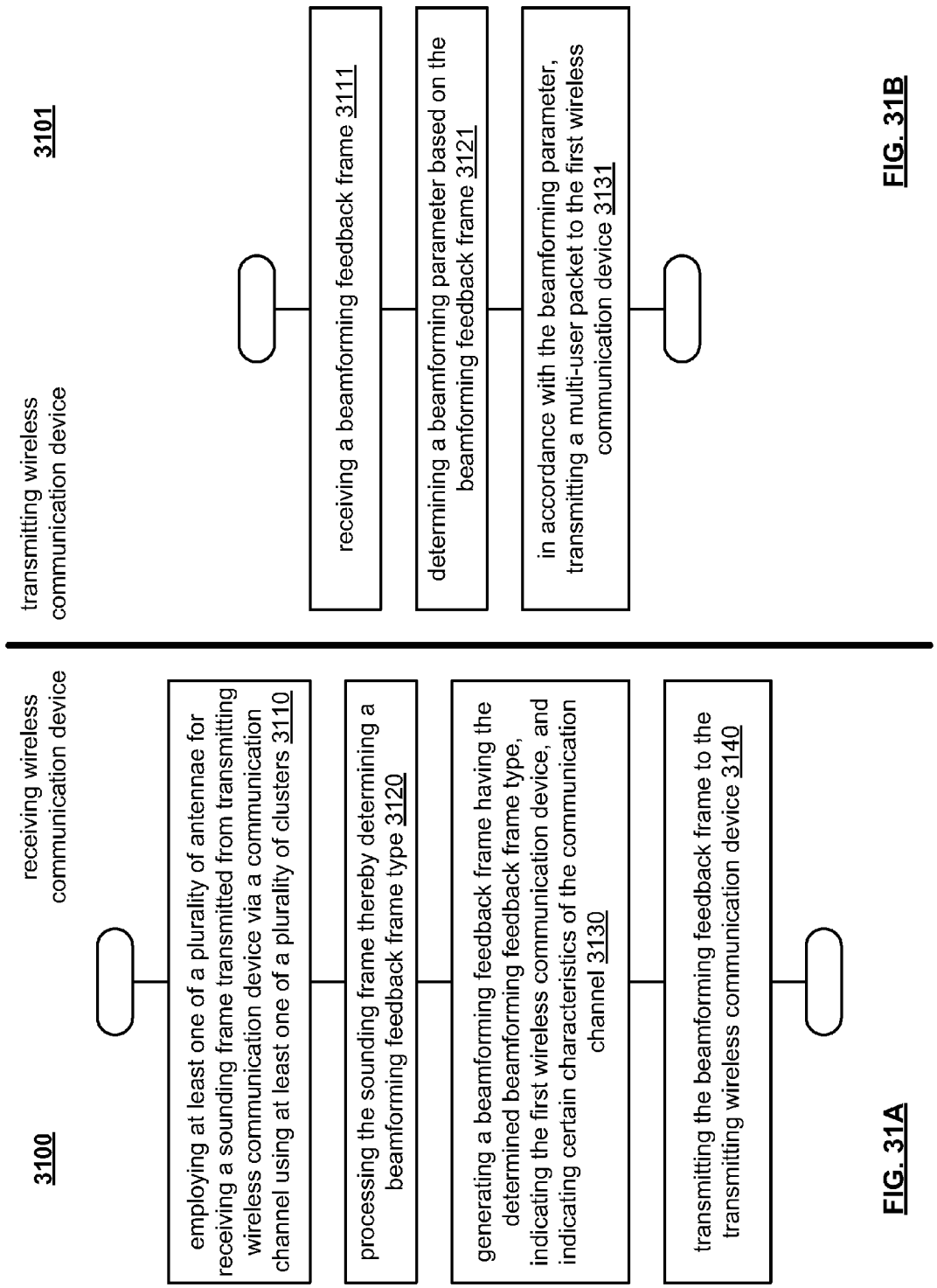

BEAMFORMING FEEDBACK FRAME FORMATS WITHIN MULTIPLE USER, MULTIPLE ACCESS, AND/OR MIMO WIRELESS COMMUNICATIONS

CROSS REFERENCE TO RELATED PATENTS/PATENT APPLICATIONS

Continuation Priority Claim, 35 U.S.C. §120

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:
1. U.S. Utility patent application Ser. No. 12/856,474, entitled "Beamforming feedback frame formats within multiple user, multiple access, and/or MIMO wireless communications," filed Aug. 13, 2010, pending, and scheduled subsequently to be issued as U.S. Pat. No. 8,576,804 on Nov. 5, 2013 (as indicated in an ISSUE NOTIFICATION mailed from the USPTO on Oct. 16, 2013), which claims priority pursuant to 35 U.S.C. §119(e) to the following U.S. Provisional Patent Application which is hereby incorporated herein by reference in its entirety and made part of the present U.S. Utility patent application for all purposes:
   a. U.S. Provisional Application Ser. No. 61/233,643, entitled "WLAN beamforming feedback frame," filed Aug. 13, 2009, now expired.

INCORPORATION BY REFERENCE

The following IEEE standard is hereby incorporated herein by reference in its entirety and is made part of the present U.S. Utility patent application for all purposes:
1. IEEE 802.11-2007, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, IEEE Std 802.11™-2007, (Revision of IEEE Std 802.11-1999), 1232 pages.

BACKGROUND OF THE INVENTION

1. Technical Field of the Invention

The invention relates generally to communication systems; and, more particularly, it relates to beamforming feedback frame formats within multiple user, multiple access, and/or MIMO wireless communications.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802, 11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs.

Therefore, a need exists for a WLAN device that is capable of high data throughput and is backward compatible with legacy devices.

BRIEF DESCRIPTION OF THE SEVERAL VIEWS OF THE DRAWINGS

FIG. 17A is a diagram illustrating an embodiment of a beamforming report frame format.

FIG. 17B is a diagram illustrating an embodiment of a cluster control field.

FIG. 18A is a diagram illustrating an embodiment of a multiple input multiple output (MIMO) control field.

FIG. 18B is a diagram illustrating an embodiment of a field following the antenna selection bit, when set, within the MIMO control field of FIG. 18A.

FIG. 19 is a diagram illustrating an embodiment of subfields of the MIMO control field of FIG. 18A.

FIG. 20 is a diagram illustrating an embodiment of a channel/state information (CSI) report field.

FIG. 21 is a diagram illustrating an alternative embodiment of a CSI report field.

FIG. 22 is a diagram illustrating an embodiment of a beamforming feedback report for one of the respective tones (or carriers) or group of tones (carriers) as may be employed in accordance with a CSI report field.

FIG. 23 is a diagram illustrating an embodiment of a non-compressed beamforming feedback report field.

FIG. 24 is a diagram illustrating an alternative embodiment of a non-compressed beamforming feedback report field.

FIG. 25 is a diagram illustrating an embodiment of a beamforming feedback report for one of the respective tones (or carriers) or group of tones (carriers) as may be employed in accordance with a non-compressed beamforming feedback report field FIG. 26 is a diagram illustrating an embodiment of a compressed beamforming feedback report field.

FIG. 27 is a diagram illustrating an alternative embodiment of a compressed beamforming feedback report field.

FIG. 28 is a diagram illustrating an embodiment of a beamforming feedback report for one of the respective tones (or carriers) or group of tones (carriers) as may be employed in accordance with a compressed beamforming feedback report field.

FIG. 29 is a diagram illustrating an embodiment of an ordering of angles in accordance with a compressed beamforming matrix field.

FIG. 30 is a diagram illustrating an alternative embodiment of an ordering of angles in accordance with a compressed beamforming matrix field.

FIG. 31A and FIG. 31B are diagrams illustrating various embodiments of methods for operating one or more wireless communication devices.

DETAILED DESCRIPTION OF THE INVENTION

Figure 1:
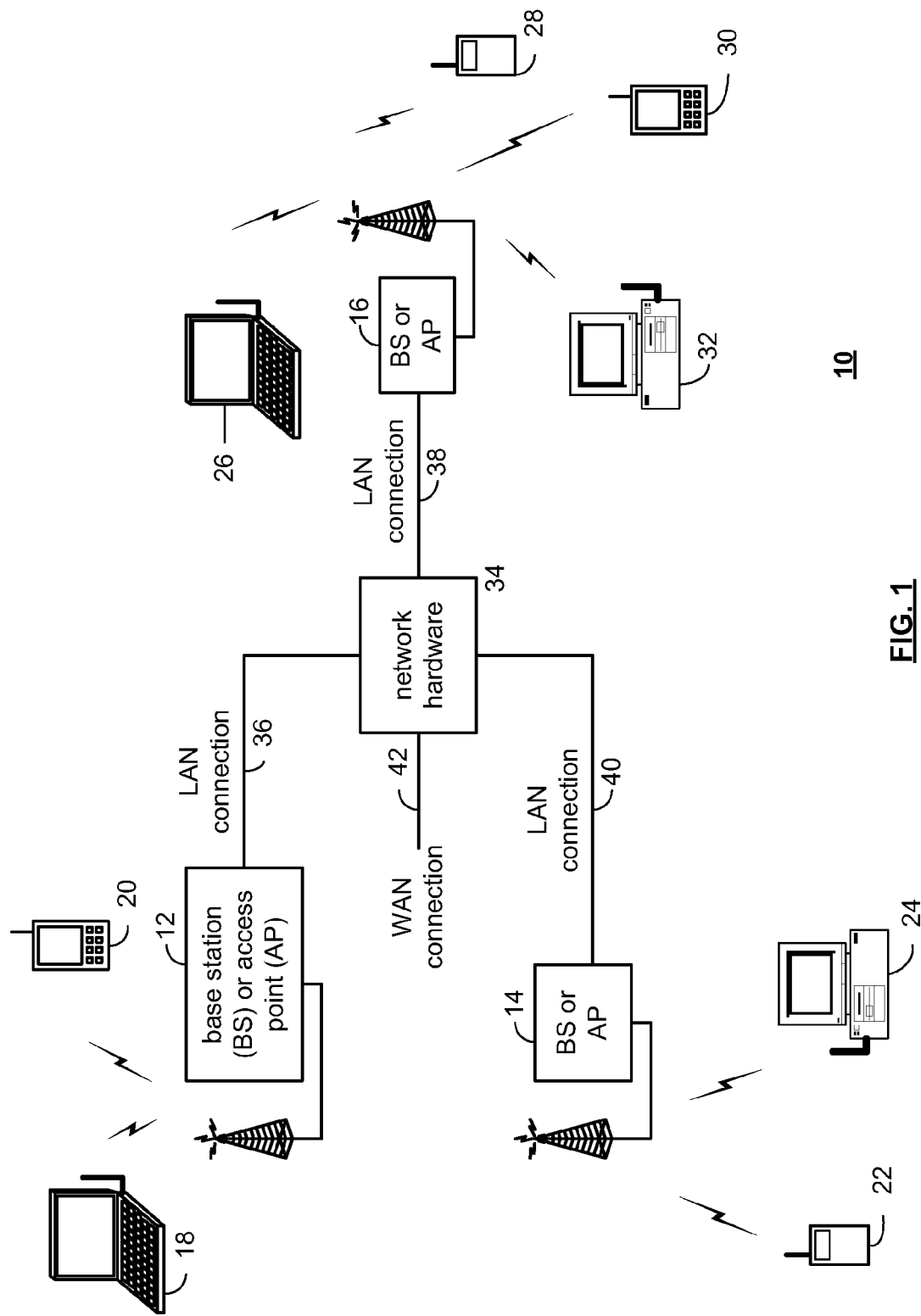
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices is described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication devices may operate in accordance with the various aspects of the invention as presented herein to enhance performance, reduce costs, reduce size, and/or enhance broadband applications.

Figure 2:
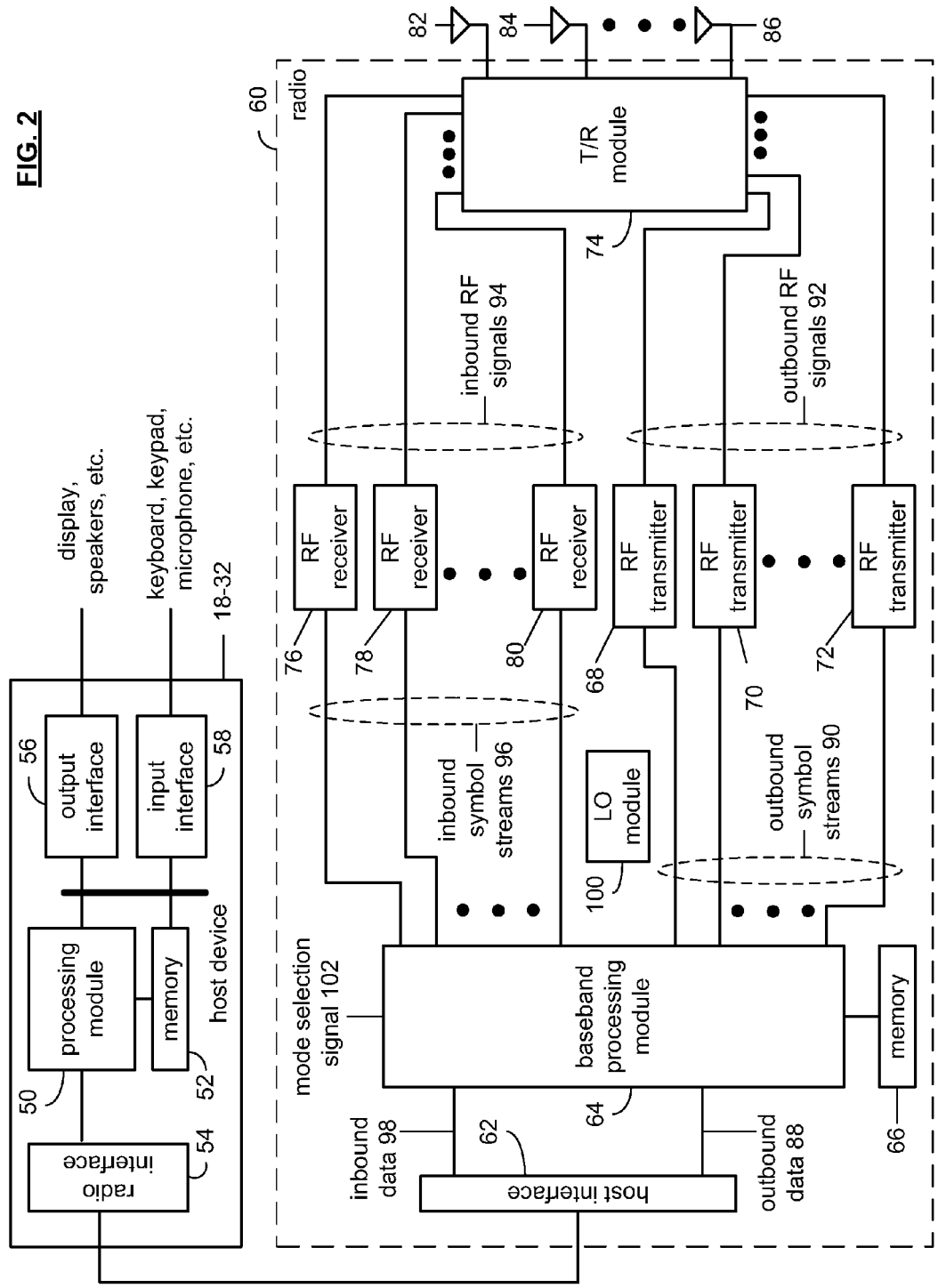
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables (see APPENDIX B), which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), and data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 64 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module, which will be described in greater detail with reference to FIGS. 10A and 10B, includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
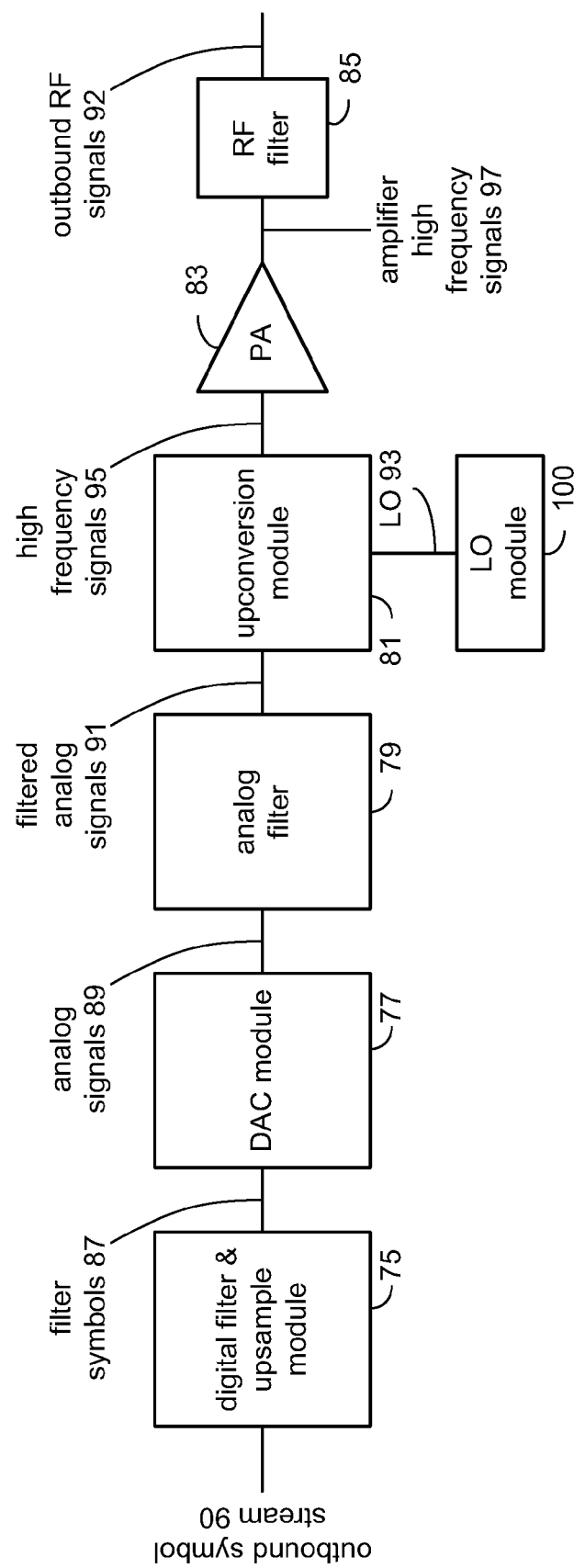
FIG. 3 is a diagram illustrating an embodiment of a radio frequency (RF) transmitter.

FIG. 3 is a diagram illustrating an embodiment of a radio frequency (RF) transmitter 68-72, or RF front-end, of the WLAN transmitter. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the outbound RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
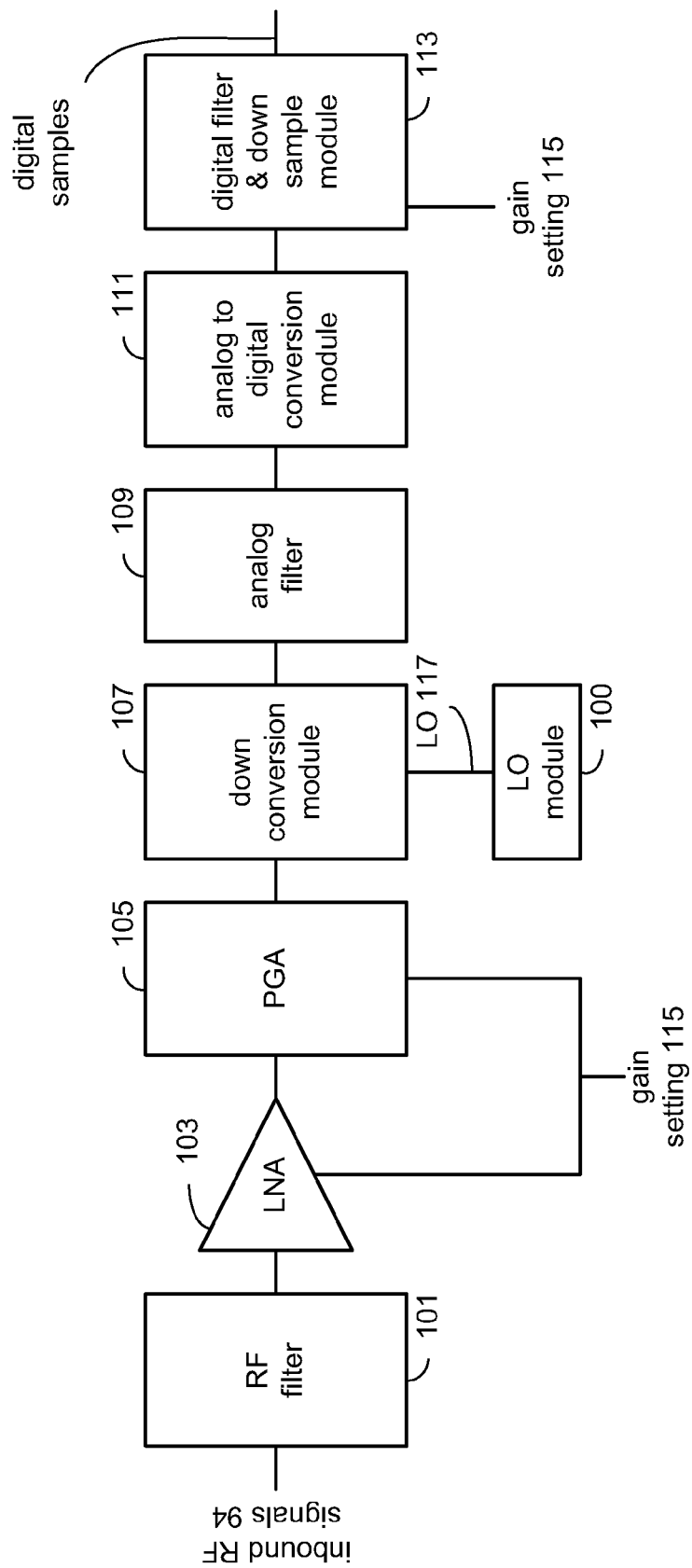
FIG. 4 is a diagram illustrating an embodiment of an RF receiver.

FIG. 4 is a diagram illustrating an embodiment of an RF receiver. This may depict any one of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency band-pass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the digital samples (corresponding to the inbound symbol streams 96).

Figure 5:
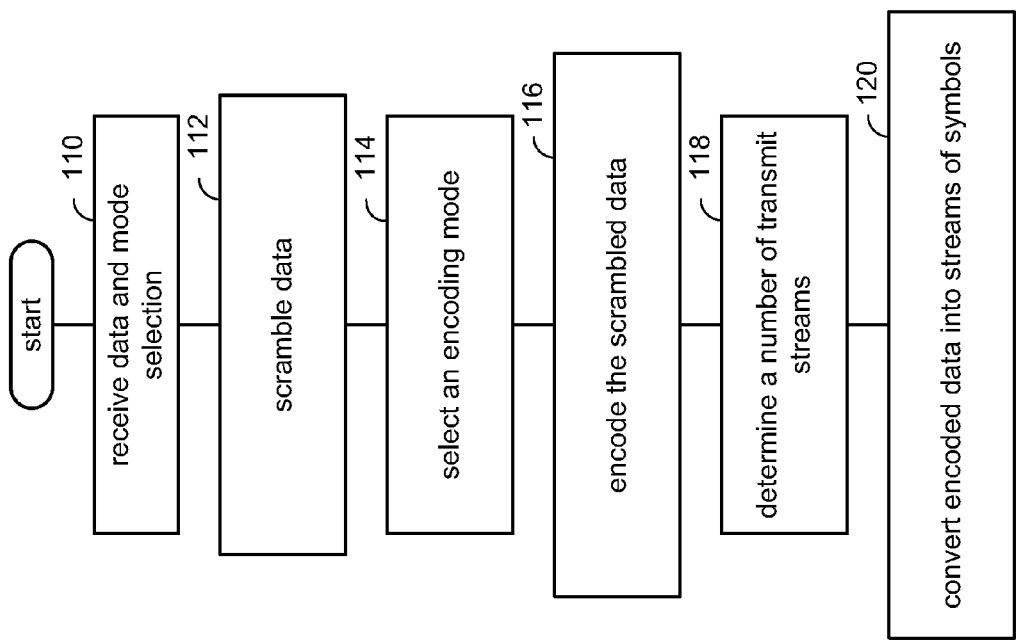
FIG. 5 is a diagram illustrating an embodiment of a method for baseband processing of data.

FIG. 5 is a diagram illustrating an embodiment of a method for baseband processing of data. This diagram shows a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing any one or more a variety of coding schemes (e.g., convolutional coding, Reed-Solomon (RS) coding, turbo coding, turbo trellis coded modulation (TTCM) coding, LDPC (Low Density Parity Check) coding, etc.).

The process then proceeds to Step 118 where the baseband processing module determines a number of transmit streams based on the mode select signal. For example, the mode select signal will select a particular mode which indicates that 1, 2, 3, 4 or more antennae may be utilized for the transmission. Accordingly, the number of transmit streams will correspond to the number of antennae indicated by the mode select signal. The process then proceeds to Step 120 where the baseband processing module converts the encoded data into streams of symbols in accordance with the number of transmit streams in the mode select signal. This step will be described in greater detail with reference to FIG. 6.

Figure 6:
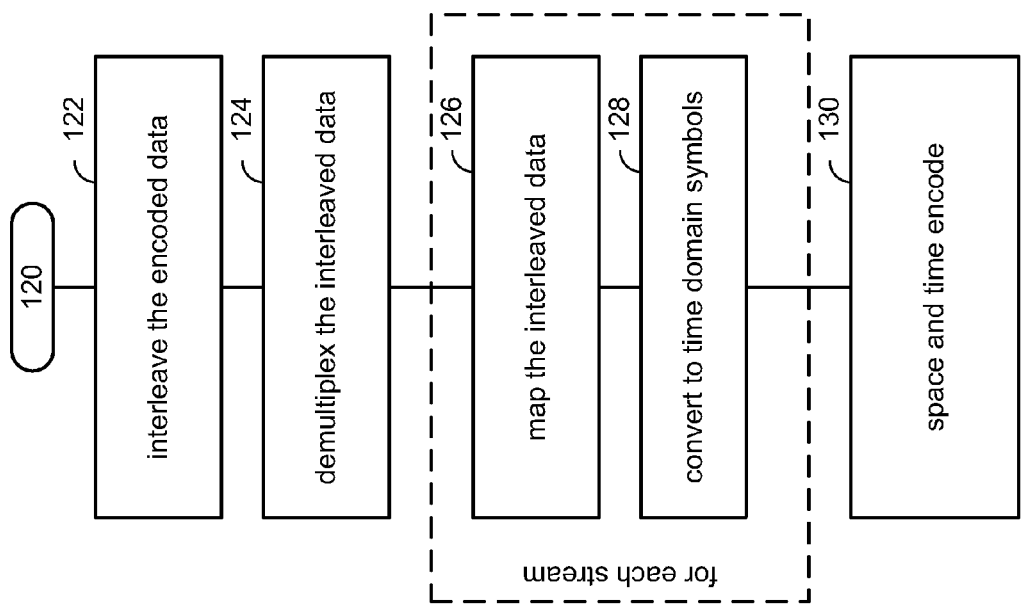
FIG. 6 is a diagram illustrating an embodiment of a method that further defines Step 120 of FIG. 5.

FIG. 6 is a diagram illustrating an embodiment of a method that further defines Step 120 of FIG. 5. This diagram shows a method performed by the baseband processing module to convert the encoded data into streams of symbols in accordance with the number of transmit streams and the mode select signal. Such processing begins at Step 122 where the baseband processing module interleaves the encoded data over multiple symbols and subcarriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennae indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=2M In one embodiment the encoding matrix may comprise a form of:

$$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}$$

The number of rows of the encoding matrix corresponds to M and the number of columns of the encoding matrix corresponds to P. The particular symbol values of the constants within the encoding matrix may be real or imaginary numbers.

Figure 9:
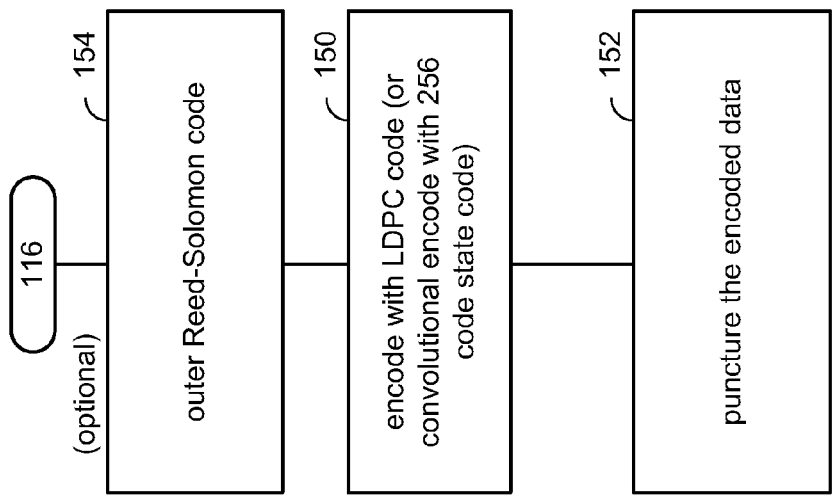
FIGS. 7-9 are diagrams illustrating various embodiments for encoding the scrambled data.
Figure 8:
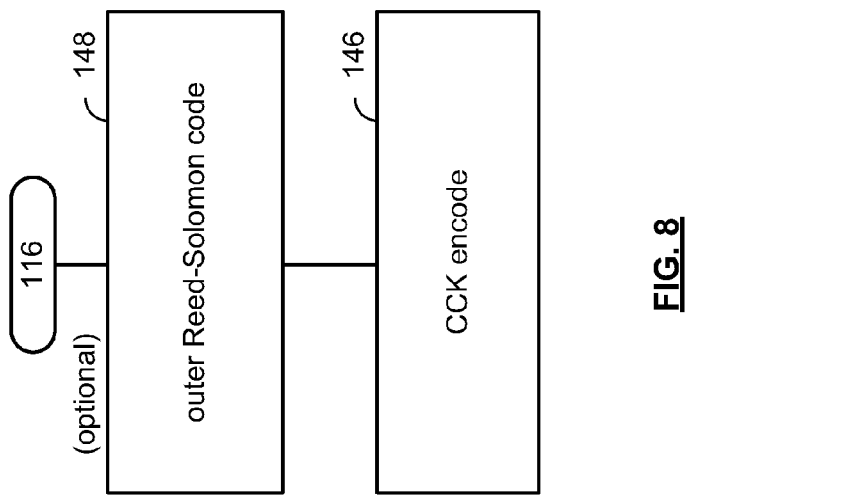
Figure 7:
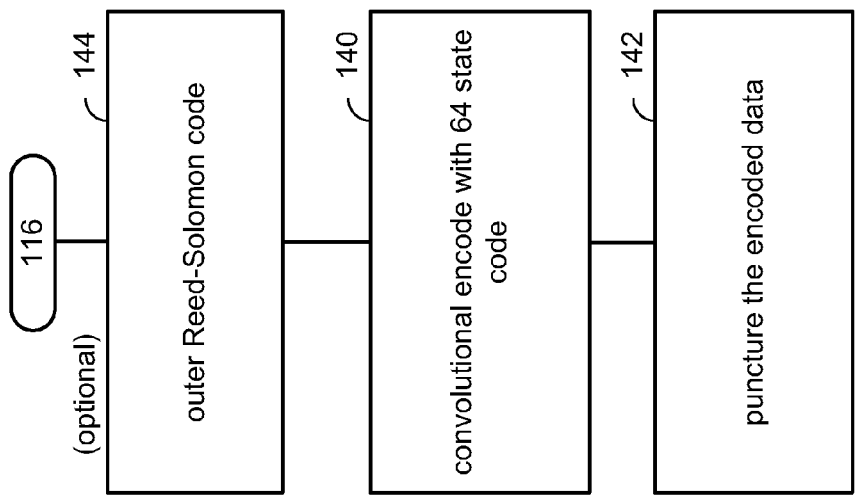

FIGS. 7-9 are diagrams illustrating various embodiments for encoding the scrambled data.

FIG. 7 is a diagram of one method that may be utilized by the baseband processing module to encode the scrambled data at Step 116 of FIG. 5. In this method, the encoding of FIG. 7 may include an optional Step 144 where the baseband processing module may optionally perform encoding with an outer Reed-Solomon (RS) code to produce RS encoded data. It is noted that Step 144 may be conducted in parallel with Step 140 described below.

Also, the process continues at Step 140 where the baseband processing module performs a convolutional encoding with a 64 state code and generator polynomials of $G_0=133_8$ and $G_1=171_8$ on the scrambled data (that may or may not have undergone RS encoding) to produce convolutional encoded data. The process then proceeds to Step 142 where the baseband processing module punctures the convolutional encoded data at one of a plurality of rates in accordance with the mode selection signal to produce the encoded data. Note that the puncture rates may include 1/2, 2/3 and/or 3/4, or any rate as specified in tables 1-12. Note that, for a particular mode, the rate may be selected for backward compatibility with IEEE 802.11(a), IEEE 802.11(g), or IEEE 802.11(n) rate requirements.

FIG. 8 is a diagram of another encoding method that may be utilized by the baseband processing module to encode the scrambled data at Step 116 of FIG. 5. In this embodiment, the encoding of FIG. 8 may include an optional Step 148 where the baseband processing module may optionally perform encoding with an outer RS code to produce RS encoded data. It is noted that Step 148 may be conducted in parallel with Step 146 described below.

The method then continues at Step 146 where the baseband processing module encodes the scrambled data (that may or may not have undergone RS encoding) in accordance with a complimentary code keying (CCK) code to produce the encoded data. This may be done in accordance with IEEE 802.11(b) specifications, IEEE 802.11(g), and/or IEEE 802.11(n) specifications.

FIG. 9 is a diagram of yet another method for encoding the scrambled data at Step 116, which may be performed by the baseband processing module. In this embodiment, the encoding of FIG. 9 may include an optional Step 154 where the baseband processing module may optionally perform encoding with an outer RS code to produce RS encoded data.

Then, in some embodiments, the process continues at Step 150 where the baseband processing module performs LDPC (Low Density Parity Check) coding on the scrambled data (that may or may not have undergone RS encoding) to produce LDPC coded bits. Alternatively, the Step 150 may operate by performing convolutional encoding with a 256 state code and generator polynomials of $G_0=561_8$ and $G_1=753_8$ on the scrambled data the scrambled data (that may or may not have undergone RS encoding) to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
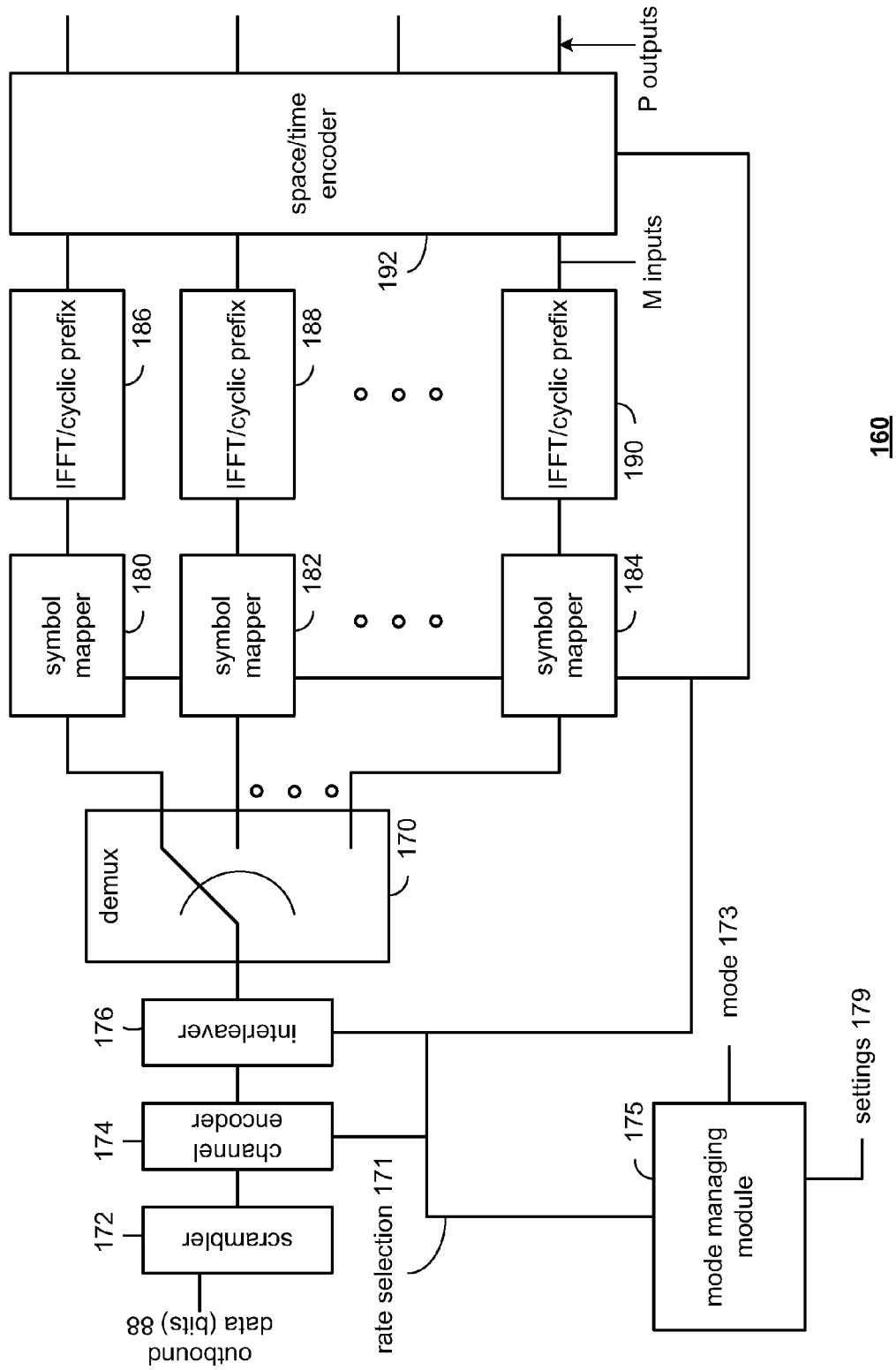
FIGS. 10A and 10B are diagrams illustrating embodiments of a radio transmitter.
Figure 10B:
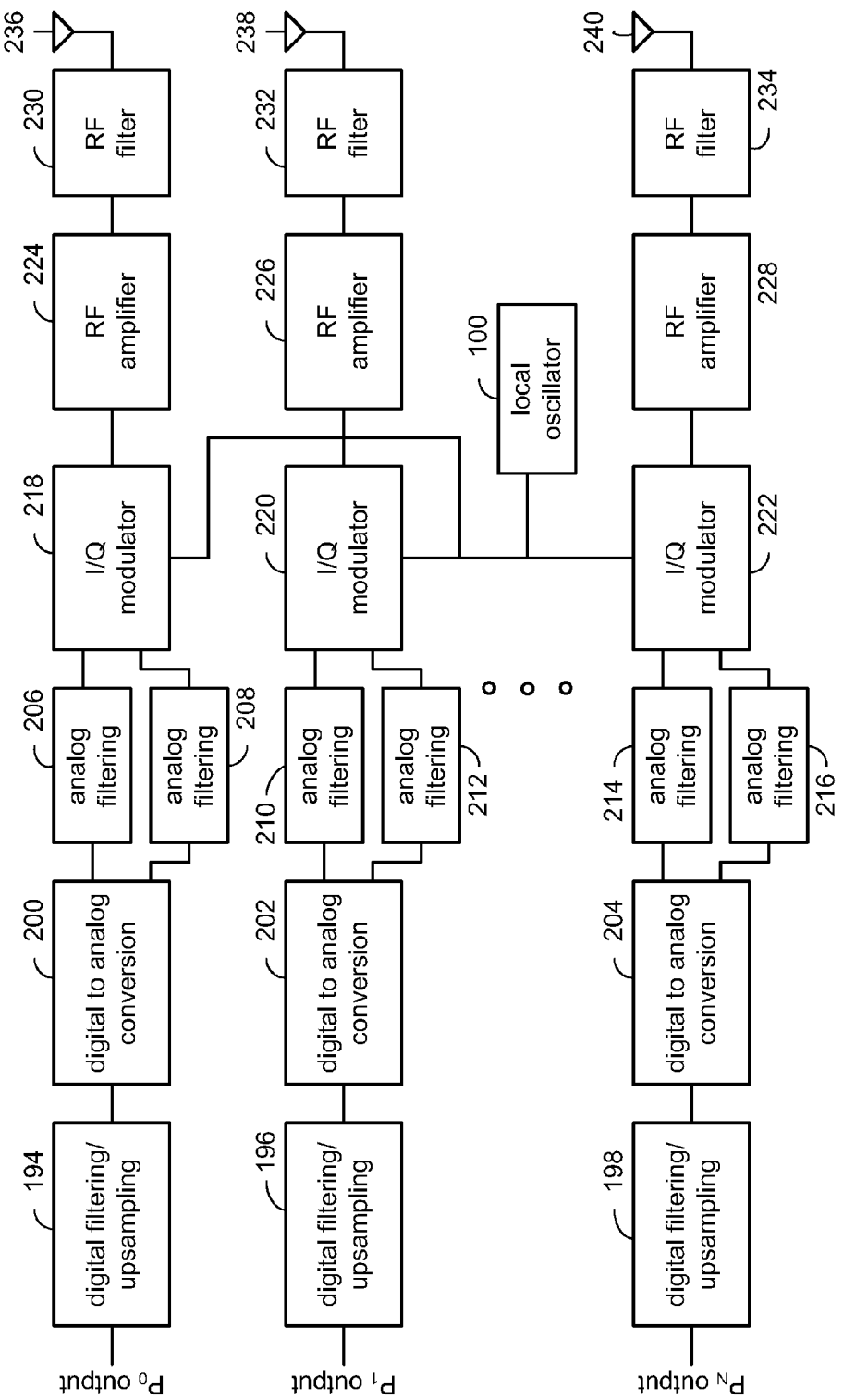

FIGS. 10A and 10B are diagrams illustrating embodiments of a radio transmitter. This may involve the PMD module of a WLAN transmitter. In FIG. 10A, the baseband processing is shown to include a scrambler 172, channel encoder 174, interleaver 176, demultiplexer 170, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal 173 and produces settings 179 for the radio transmitter portion and produces the rate selection 171 for the baseband portion. In this embodiment, the scrambler 172, the channel encoder 174, and the interleaver 176 comprise an error protection module. The symbol mappers 180-184, the plurality of IFFT/cyclic prefix modules 186-190, the space time encoder 192 comprise a portion of the digital baseband processing module.

In operations, the scrambler 172 adds (e.g., in a Galois Finite Field (GF2)) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate 1/2 convolutional encoder with 64 states and a generator polynomials of $G_0=133_8$ and $G_1=171_8$. The output of the convolutional encoder may be punctured to rates of 1/2, 2/3, and 3/4 according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, any one or more of the various types of error correction codes (ECCs) mentioned above (e.g., RS, LDPC, turbo, TTCM, etc.) a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to subsequent Figures.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 170 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, et cetera) according to the rate tables (e.g., tables 1-12). For IEEE 802.11(a) backward compatibility, double Gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal 2M paths. For each of the paths, the space/time encoder multiples the input symbols with an encoding matrix that has the form of $$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}.$$

The rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennae 236-240. The P-outputs from the space/time encoder 192 are received by respective digital filtering/up-sampling modules 194-198. In one embodiment, the digital filters/up sampling modules 194-198 are part of the digital baseband processing module and the remaining components comprise the plurality of RF front-ends. In such an embodiment, the digital baseband processing module and the RF front end comprise a direct conversion module.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 206-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals.

The RF amplifiers 224-228 amplify the RF signals which are then subsequently filtered via RF filters 230-234 before being transmitted via antennae 236-240.

Figure 11A:
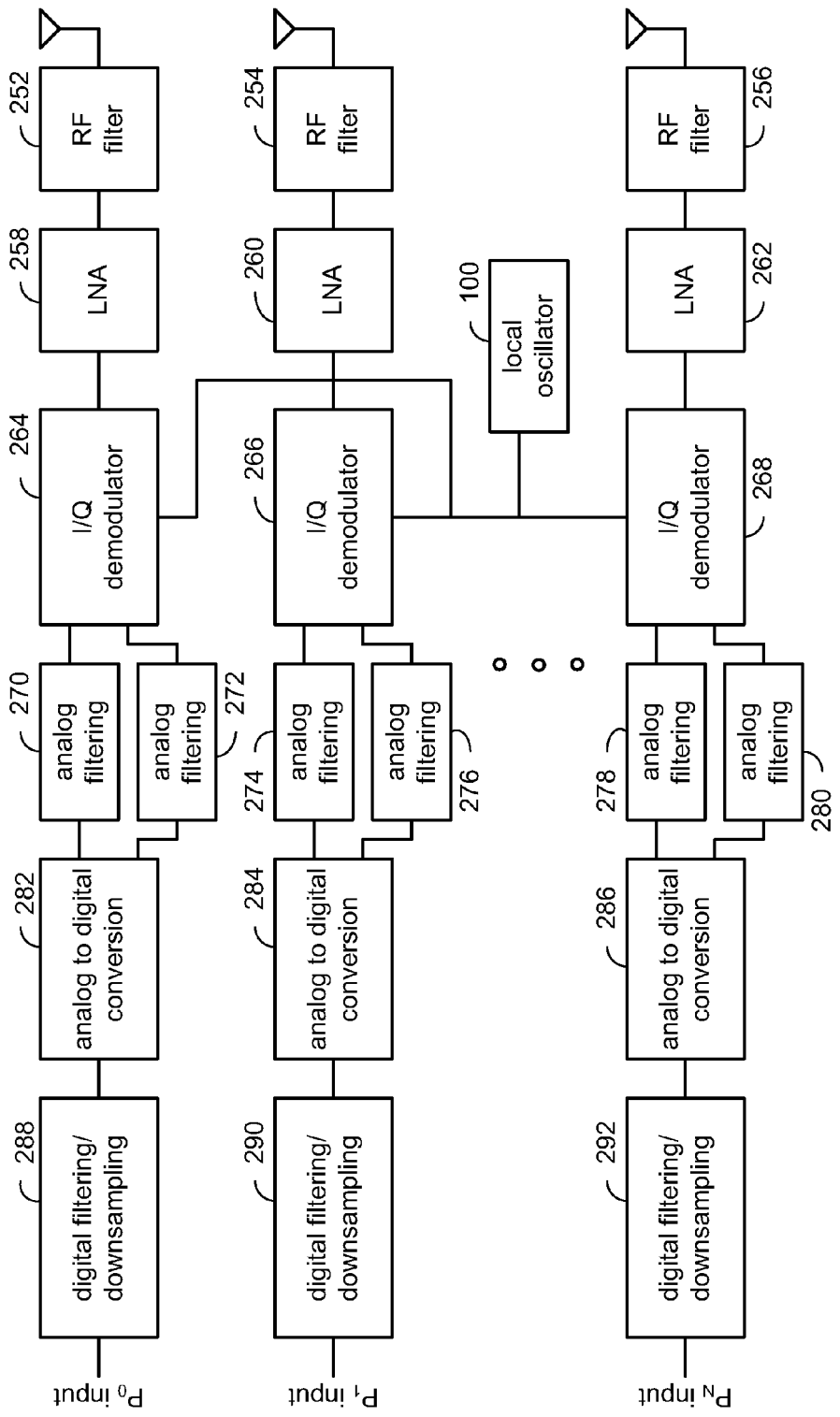
FIGS. 11A and 11B are diagrams illustrating embodiments of a radio receiver.
Figure 11B:
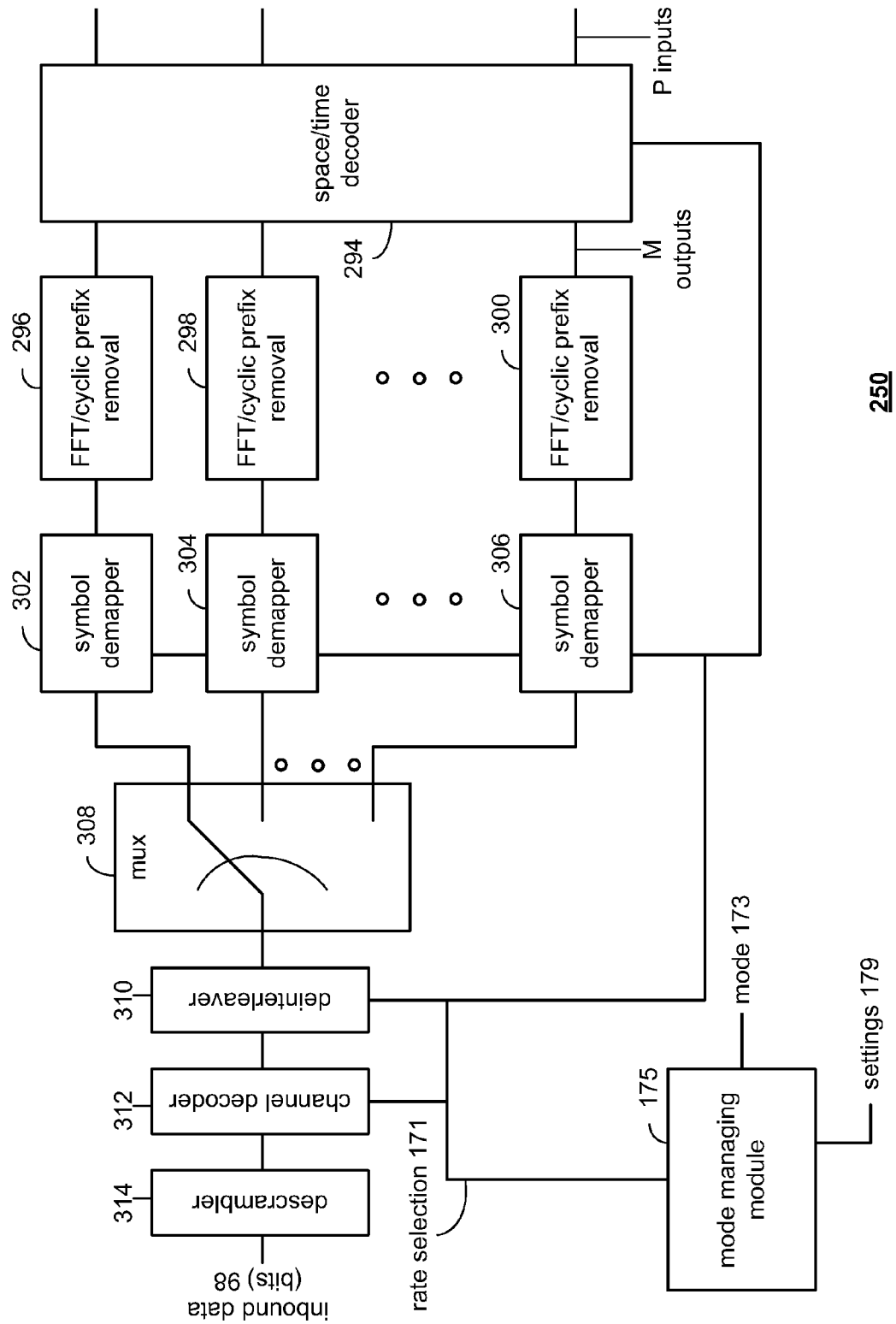

FIGS. 11A and 11B are diagrams illustrating embodiments of a radio receiver (as shown by reference numeral 250). These diagrams illustrate a schematic block diagram of another embodiment of a receiver. FIG. 11A illustrates the analog portion of the receiver which includes a plurality of receiver paths. Each receiver path includes an antenna, RF filters 252-256, low noise amplifiers 258-262, I/Q demodulators 264-268, analog filters 270-280, analog-to-digital converters 282-286 and digital filters and down-sampling modules 288-290.

In operation, the antennae receive inbound RF signals, which are band-pass filtered via the RF filters 252-256. The corresponding low noise amplifiers 258-262 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175, which produces rate selections 171 and settings 179 based on mode selections 173. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 12:
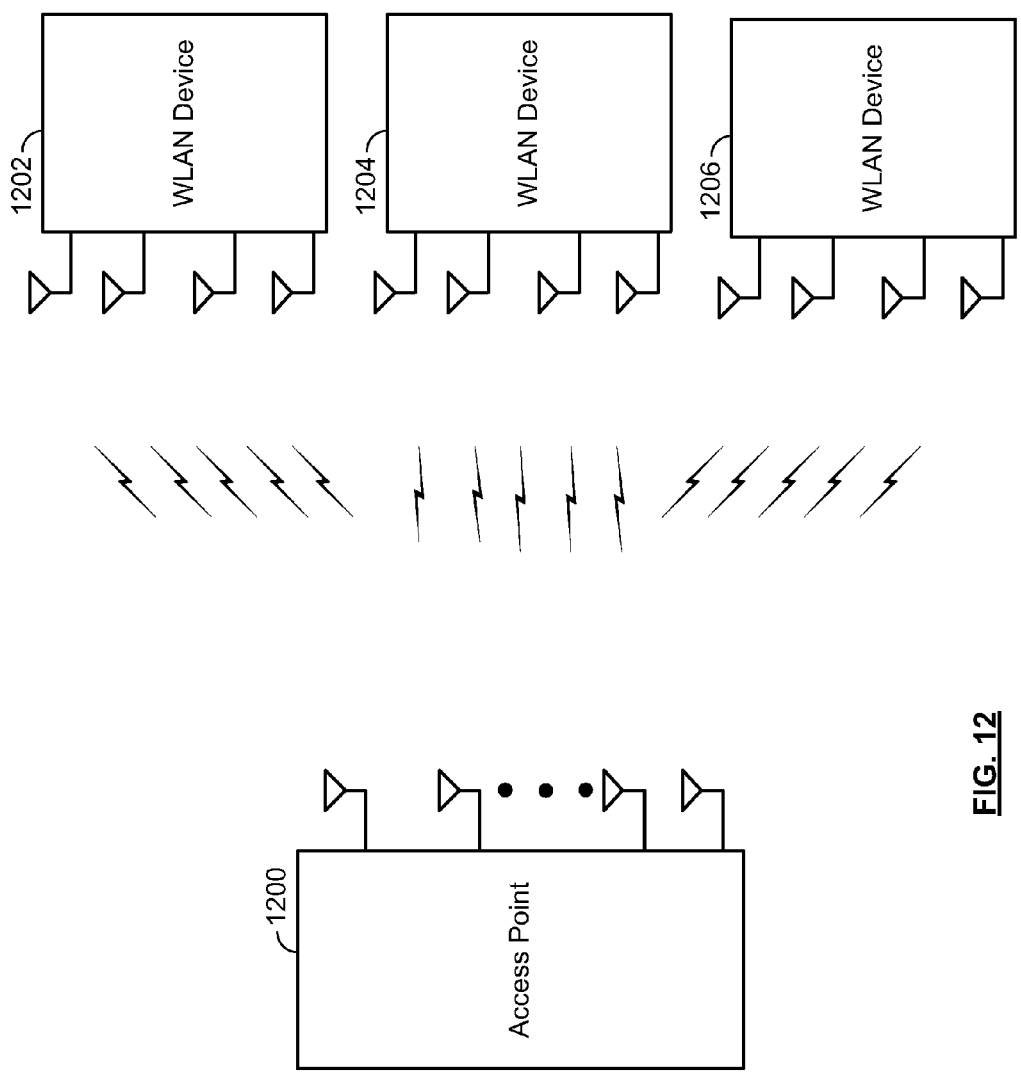
FIG. 12 is a diagram illustrating an embodiment of an access point (AP) and multiple wireless local area network (WLAN) devices operating according to one or more various aspects and/or embodiments of the invention.

FIG. 12 is a diagram illustrating an embodiment of an access point (AP) and multiple wireless local area network (WLAN) devices operating according to one or more various aspects and/or embodiments of the invention. The AP point 1200 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 1200 supports communications with the WLAN devices 1202, 1204, and 1206 with channel bandwidths, MIMO dimensions, and at data throughput rates unsupported by the prior IEEE 802.11x operating standards. For example, the access point 1200 and WLAN devices 1202, 1204, and 1206 may support channel bandwidths from those of prior version devices and from 40 MHz to 1.28 GHz and above. The access point 1200 and WLAN devices 1202, 1204, and 1206 support MIMO dimensions to 4×4 and greater. With these characteristics, the access point 1200 and WLAN devices 1202, 1204, and 1206 may support data throughput rates to 1 GHz and above.

The AP 1200 supports simultaneous communications with more than one of the WLAN devices 1202, 1204, and 1206. Simultaneous communications may be serviced via OFDM tone allocations (e.g., certain number of OFDM tones in a given cluster), MIMO dimension multiplexing, or via other techniques. With some simultaneous communications, the AP 1200 may allocate one or more of the multiple antennae thereof respectively to support communication with each WLAN device 1202, 1204, and 1206, for example.

Further, the AP 1200 and WLAN devices 1202, 1204, and 1206 are backwards compatible with the IEEE 802.11(a), (b), (g), and (n) operating standards. In supporting such backwards compatibility, these devices support signal formats and structures that are consistent with these prior operating standards.

Generally, communications as described herein may be targeted for reception by a single receiver or for multiple individual receivers (e.g. via multi-user multiple input multiple output (MU-MIMO), and/or OFDMA transmissions, which are different than single transmissions with a multi-receiver address). For example, a single OFDMA transmission uses different tones or sets of tones (e.g., clusters or channels) to send distinct sets of information, each set of set of information transmitted to one or more receivers simultaneously in the time domain. Again, an OFDMA transmission sent to one user is equivalent to an OFDM transmission. A single MU-MIMO transmission may include spatially-diverse signals over a common set of tones, each containing distinct information and each transmitted to one or more distinct receivers. Some single transmissions may be a combination of OFDMA and MU-MIMO. MIMO transceivers illustrated may include SISO, SIMO, and MISO transceivers. The clusters employed for such communications may be continuous (e.g., adjacent to one another) or discontinuous (e.g., separated by a guard interval of band gap). Transmissions on different OFDMA clusters may be simultaneous or non-simultaneous. Such wireless communication devices as described herein may be capable of supporting communications via a single cluster or any combination thereof. Legacy users (e.g., TGa and/or TGn, etc.) and new version users (e.g., TGac MU-MIMO, OFDMA, MU-MIMO/OFDMA, etc.) may share bandwidth at a given time or they can be scheduled at different times for certain embodiments. Moreover, a transmitting wireless communication device (e.g., such as a MU-MIMO, OFDMA, or combination OFDMA/MU-MIMO transmitter) may transmit multi-user packets to more than one receiving wireless communication devices (e.g., STAs) on a same cluster within a single aggregated multi-user packet (e.g., in accordance with in a time-multiplexed signaling). When operating in accordance with such a multi-user (MU) communication system, channel training (e.g., channel estimation, characterization, etc.) is typically performed with respect to the various communication channels/paths between the transmitting wireless communication device and each of the receiving wireless communication devices. Of course, when two or more receiving wireless communication devices are relatively located close to one another (e.g., within a particularly close or small region), channel training corresponding to one of those closely located wireless communication devices may be applied and used for other of those closely located wireless communication devices as well.

Figure 13:
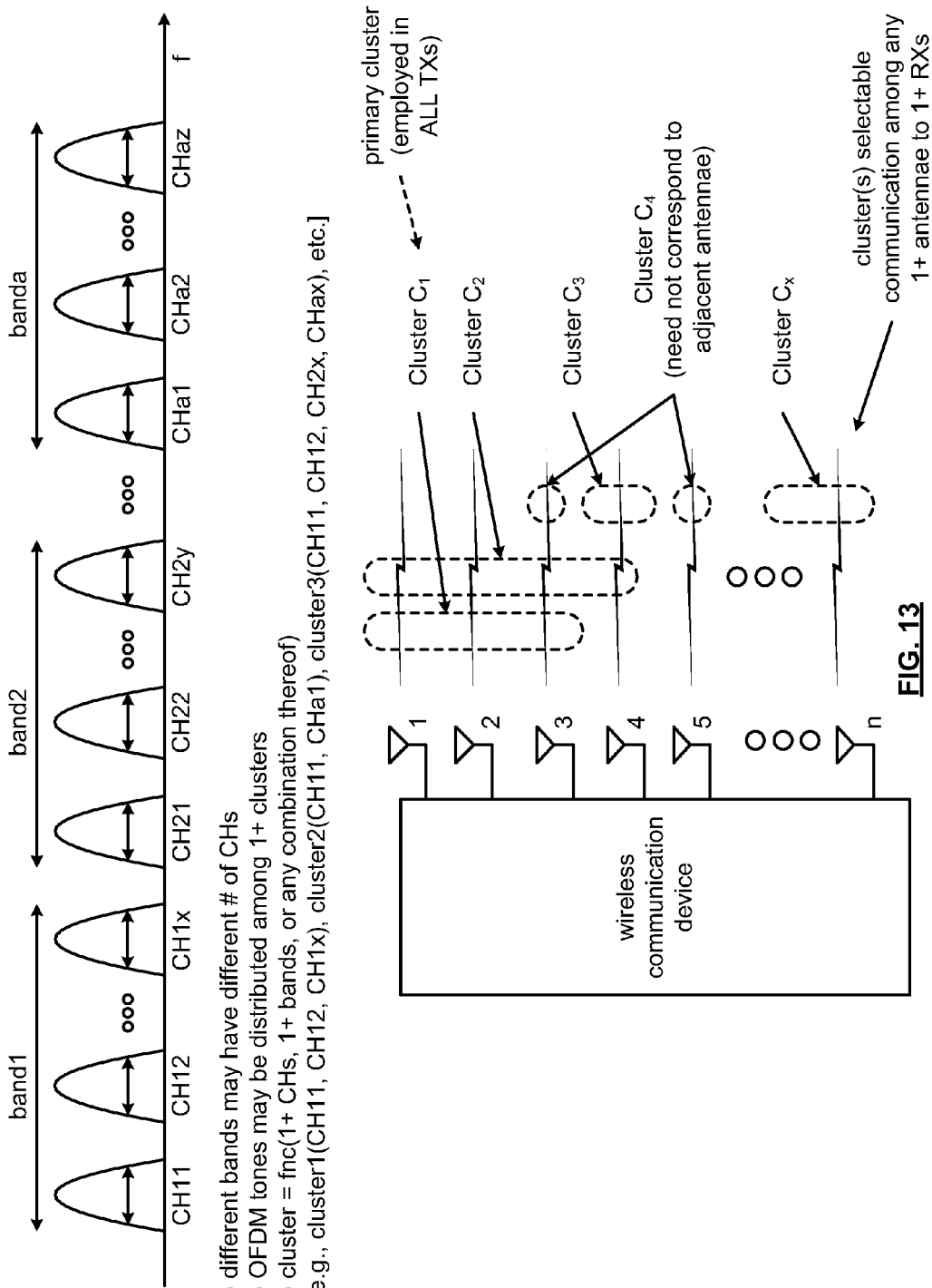
FIG. 13 is a diagram illustrating an embodiment of a wireless communication device, and clusters, as may be employed for supporting communications with at least one additional wireless communication device.

FIG. 13 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination one or more channels among one or more bands. As may be seen in the diagram, any respective cluster may be associated with any one or more antennae (including as few as one antenna as well as up to all of the antennae) of the wireless communication device.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

It is noted that while certain of the embodiments described herein illustrate a wireless communication device pictorially as having one antenna, any of the various wireless communication devices in accordance with the various principles presented herein may include a plurality of antennae. Moreover, any of the various wireless communication devices in accordance with the various principles presented herein may include multiple receive and/or transmit chains for processing signals to be transmitted to and/or received from other wireless communication devices (e.g., such as with reference to FIG. 2). It is also noted that the number of antennae within a wireless communication device need to correspond exactly to the number of chains (receive and/or transmit) within that wireless communication device. For example, appropriate processing of signals received or to be transmitted by a plurality of antennae may be performed to process those signals using a number of chains (receive and/or transmit) that is different than the number of antennae within the wireless communication device.

Figure 14:
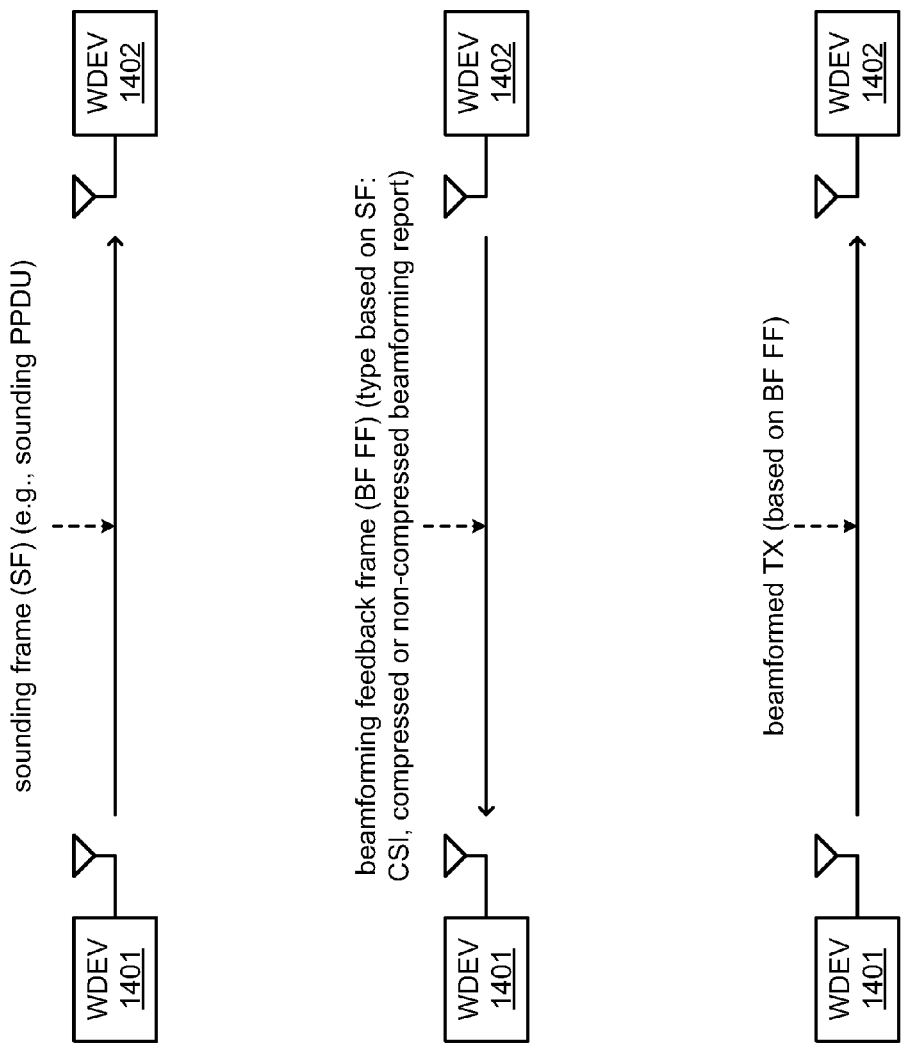
FIG. 14 is a diagram illustrating an embodiment showing various communications between at least two wireless communication devices.

FIG. 14 is a diagram illustrating an embodiment showing various communications between at least two wireless communication devices. A transmitting wireless communication device 1401 initially employs one or more antennae to transmit a sounding frame (SF) to one a receiving wireless communication device 1402. The SF may be transmitted using one or more selected clusters in accordance with a certain mapping to the one or more antennae. In some instances, similar or same signals are transmitted on all of the one or more selected clusters and/or on all of the one or more antennae.

Such a SF may be a PLCP Protocol Data Unit (PPDU) such as constructed in accordance with the WLAN protocol (e.g., in accordance with IEEE 802.11x standards or recommended practices, where x is a, b, g, n, ac, etc.). Upon receipt of the SF by the receiving wireless communication device 1402 using one or more of its antennae, one or more receive chains therein operate to process the SF to determine what type of beamforming feedback frame the transmitting wireless communication device 1401 has requested (as indicated within the SF). Examples of various types of beamforming feedback frames include channel/state information (CSI), compressed beamforming, and non-compressed beamforming reports.

The wireless communication device 1402 then operates to generate the beamforming feedback frame that is of the determined type (as requested by the transmitting wireless communication device 1401), that indicates the wireless communication device 1402 from which the beamforming feedback frame is being sent (i.e., provides identification therein to the transmitting wireless communication device 1401 may ascertain from which wireless communication device the beamforming feedback frame has been transmitted), and that also includes any one or more of various characteristics of the communication channel between the wireless communication device 1401 and wireless communication device 1402. Various embodiments presented herein show some of the various characteristics that may be communicated in a beamforming feedback frame in accordance with various aspects of the invention (e.g., signal to noise ratios (SNRs) of communication paths between the transmitting wireless communication device 1401 and 1402, per tone (carrier) SNRs for those respective communication paths, which clusters are being reported by the wireless communication device 1402, the antenna selection/configuration of the receiving wireless communication device 1402, etc.).

As mentioned above, an example of a wireless communication device that includes multiple receive and/or transmit chains is depicted with reference to FIG. 2, and each of the wireless communication devices may include one or more antennae for receiving and/or transmitting signals.

In response to the beamforming feedback frame and based thereon, the transmitting wireless communication device 1401 is operative to determine one or more beamforming parameters for use in directing subsequent communications to the receiving wireless communication device 1402. The transmitting wireless communication device 1401 then is operative to transmit a packet (e.g., a multi-user packet) to the wireless communication device 1402 using the one or more beamforming parameters.

While this embodiment shows communications between two wireless communication devices, it is of course noted that a MU environment may be employed in which a single transmitting wireless communication device is operative to support communications with a number of receiving wireless communication devices.

With respect to the various types of beamforming feedback frames that may be employed, it is noted that the IEEE 802.11n standard specifies the compressed beamforming matrix feedback frame format. Herein, a novel approach is employed by which formats of various beamforming feedback frames may be extended to wireless communication devices having newer capabilities (e.g., TGac MU-MIMO, OFDMA, MU-MIMO/OFDMA, etc.) including wireless communication devices having more than one antennae (e.g., multiple antennae). Moreover, it is noted a common beamforming feedback frame format may be supported and employed by all such wireless communication devices when performing MU-MIMO operation such as in accordance with IEEE 802.11ac/VHT. For example, all such TGac capable wireless communication devices may employ a common beamforming feedback frame format.

In one embodiment, the beamforming feedback frame format includes antenna selection as one of the characteristics being included therein. In some embodiments (e.g., cellular applications that operate in accordance with single stream operation that only operate one of its antennae at any given time), such antenna selection information may be particularly important. Nonetheless, in any case, the particular antenna selection may be indicated within the beamforming feedback frame.

For example, considering an embodiment that includes up to 8 TX/RX antennae, the receiving wireless communication device (beamformee), can report only for Nr×Nc, where Nc≤8 (where Nc is the number of columns and Nr is the number of rows in the beamforming matrix).

While certain of the embodiments presented herein are directed to wireless communication devices that include up to 8 TX/RX antennae, it is of course noted that such principles as presented herein may be employed to scale and extend up to 16 TX/RX antennae, or quite generally up to up to N TX/RX antennae (when N is an integer).

A receiving wireless communication device (beamformee) that transmits a beamforming feedback frame to a transmitting wireless communication device in response to a sounding frame (e.g., a PPDU) sent by a transmitting wireless communication device (beamformer) will a frame type as indicated within the sounding frame. Again, examples of various types of beamforming feedback frames include channel/state information (CSI), compressed beamforming, and non-compressed beamforming reports. This indication within the sounding frame is indicated within the CSI/Steering field of the HT or VHT Control field transmitted by the beamformer (e.g., HT Control field is defined in IEEE 802.11n specification, Draft 11, sub clause 7.1.3.5a).

It is also noted that the processing and generation of such signals and components thereof such as sounding frames, multi-user packets, beamforming feedback frames, etc. and calculation of various values such as SNRs, per tone (carrier) SNRs, beamforming feedback matrices, angles employed in accordance with beamforming, etc. may be performed using a baseband processing module implemented within a wireless communication device (e.g., such as in accordance with the baseband processing module as described with reference to FIG. 2).

Figure 15:
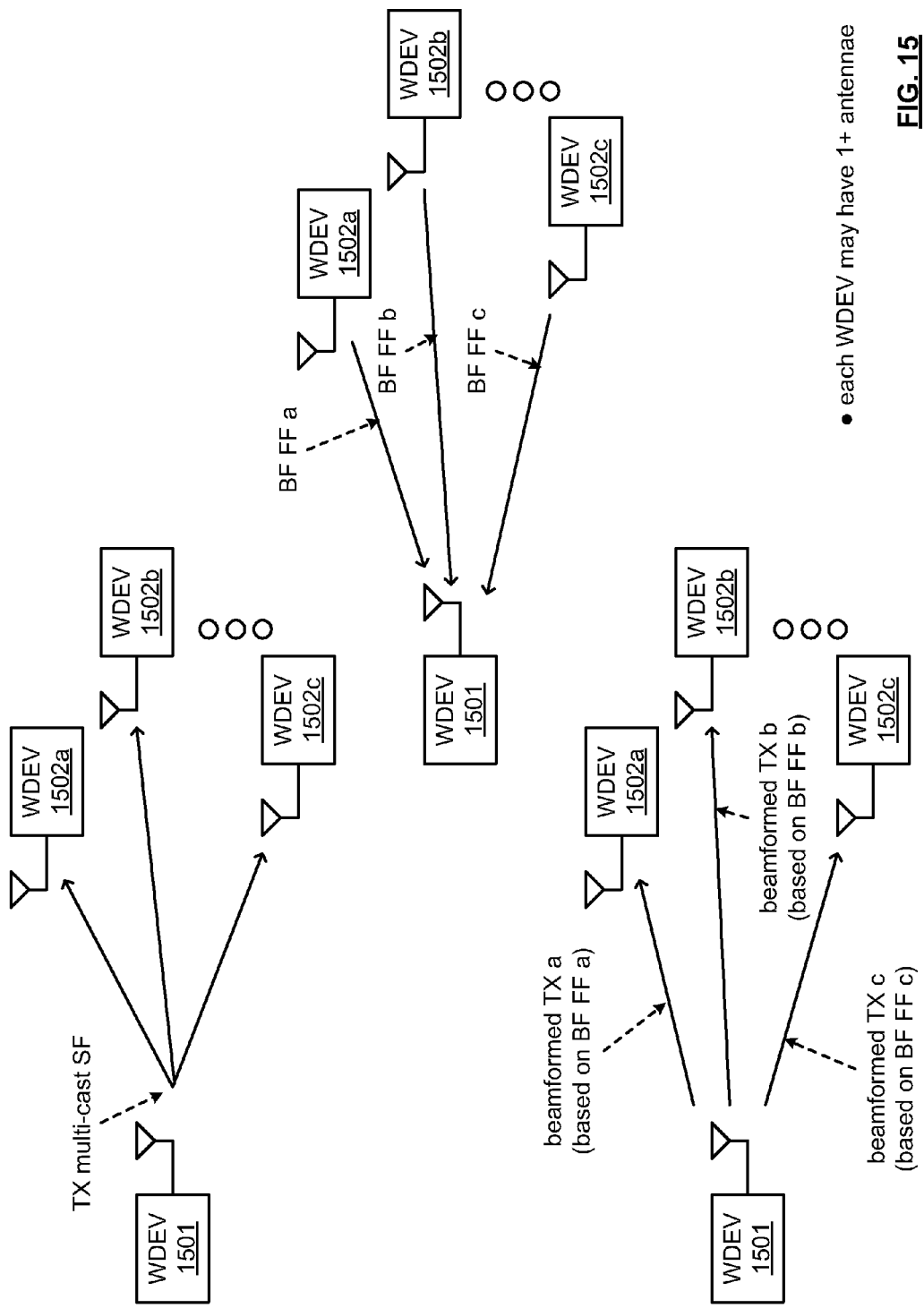
FIG. 15 is a diagram illustrating an embodiment showing various communications between various wireless communication devices in a multi-user (MU) environment.

FIG. 15 is a diagram illustrating an embodiment showing various communications between various wireless communication devices in a multi-user (MU) environment. In this embodiment, a transmitting wireless communication device 1501 transmits a sounding frame (e.g., a multi-cast sounding frame) to a plurality of wireless communication devices 1502*a*, 1502*b*, and up to 1502*c*. In response the sounding frame received by each of the respective wireless communication devices, each wireless communication device generates and transmits a respective beamforming feedback frame to the transmitting wireless communication device 1501, as shown by beamforming feedback frame A, B, and up to C. Then, in response to each of the respective received beamforming feedback frames, the transmitting wireless communication device 1501 is operative to determine at least one beamforming parameter for use in directing subsequent communications to the wireless communication devices 1502*a*, 1502*b*, and up to 1502*c*.

In some embodiments, the transmitting wireless communication device 1501 employs each respective beamforming feedback frame for generating a respective beamforming parameter for use in supporting communications with the wireless communication device from which the beamforming feedback frame was received. For example, the transmitting wireless communication device 1501 employs the beamforming feedback frame A for use in effectuating beamforming for use in accordance with communications subsequently sent to wireless communication device 1502*a*, and the transmitting wireless communication device 1501 employs the beamforming feedback frame B for use in effectuating beamforming for use in accordance with communications subsequently sent to wireless communication device 1502*b*, and so on.

In another embodiments, the transmitting wireless communication device 1501 is operative to employ one received beamforming feedback frame for generating a beamforming parameter to be used in supporting subsequent communications to a group of wireless communication devices (e.g., such as those wireless communication devices that may be relatively closely located to one another).

In yet another embodiment, the transmitting wireless communication device 1501 is operative to employ more than one received beamforming feedback frames for generating a beamforming parameter to be used in supporting subsequent communications to a singular wireless communication device or a group of wireless communication devices. In this instance, beamforming feedback frames corresponding to more than one communication path from the transmitting wireless communication device 1501 may be employed in determining one or more beamforming parameters for use in subsequent communications.

Figure 16:
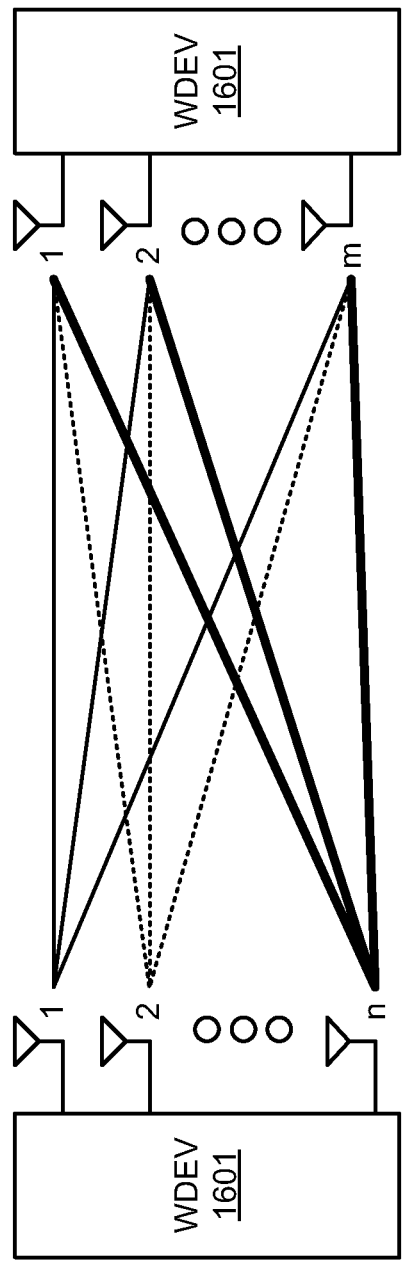
FIG. 16 is a diagram illustrating an embodiment showing various communication paths between at least two wireless communication devices each respectively having more than one antenna.

FIG. 16 is a diagram illustrating an embodiment showing various communication paths between at least two wireless communication devices each respectively having more than one antenna. This diagram shows the various communication paths that may be employed in supporting communications between wireless communication devices 1601 and 1602. Generally speaking, a signal may be transmitted from any one or more antenna of the wireless communication device 1601 to any one or more antenna of the wireless communication device 1602, and vice versa. Moreover, any one or more clusters may be employed for those various signals transmitted via the various antennae. In one example, a first signal is transmitted via a first antenna using a first cluster, a second signal is transmitted via a second antenna using a second cluster, and so on. In yet another example, a signal may be transmitted via two or more antenna using a common cluster. Generally, any antenna/cluster combination may be employed in supporting communications between the wireless communication devices 1601 and 1602.

With respect to generating and transmitting such beamforming feedback frames between wireless communication devices such as 1601 and 1602, information related to the antenna configuration employed when receiving and/or transmitting signals may be included therein. This extra degree of freedom in having varying particular antenna/cluster configurations among the various wireless communication devices incurs the communicating of such information within such beamforming feedback frames. Such information indicating any one or more of the antennae being selected or employed (e.g., from all of the antennae to any subset thereof including as few as one antenna) as well as the configuration thereof may be included within such a beamforming feedback frame.

It is also noted that while various formats of beamforming feedback frames and certain of the respective components therein are described herein, variants and/or equivalents thereof may be employed without departing from the scope and spirit of the invention. Such specific embodiments described herein are exemplary and not exhaustive; a designed has a great degree of latitude in modifying and adapting specific formats for a given application.

FIG. 17A is a diagram illustrating an embodiment of a beamforming report frame format. Such a beamforming report action frame is of one of the types: CSI, non-compressed, or compressed beamforming matrix. This is similar to the IEEE 802.11n specification (Ref: Table 7-57t in draft11). It is noted that, for cluster or channel bonding (e.g., in which two clusters or channels that are adjacent to one another are effectively treated as a singular cluster or channel, such as when the delay spread between those two is less than some threshold), then clusters or channels may not be individually treated in such instances. In other words, two (or more) such clusters or channels may be treated the same.

In such instance, a cluster or channel control field may not be employed and only one pair of fields may be employed (e.g., the MIMO control field and beamforming report field). The transmitting wireless communication device (beamformee) can perform interpolation to attempt to extract such per cluster or channel information in that only partial information is received when cluster or channel bonding is used in such an embodiment.

FIG. 17B is a diagram illustrating an embodiment of a cluster control field. The cluster control field indicates the number of clusters to be reported in this particular feedback report. For example, one octet (e.g., in a base 8 number system including 8 digits) may be used in embodiments including up to 8 TX/RX antennae such that each respective bit corresponds to one of the antenna in the array. Of course, other cluster control field sizes may be possible in other embodiments such as for those wireless communication devices including fewer or more antenna.

FIG. 18A is a diagram illustrating an embodiment of a multiple input multiple output (MIMO) control field. The order of bits within the MIMO control field may be the same as within the long training symbol (LTRN). The indices for number of columns, Nc, and the number of rows, Nr, of the beamforming matrix to be reported in the beamforming feedback frame and are included within the first two fields, respectively, of the MIMO control field.

The MIMO control channel cluster indicates the cluster number to be reported in the beamforming feedback frame. For example, considering a channel bonding example, this field indicates the bandwidth as follows: 0 for 20 MHz, 1 for 40 MHz or 2 for 80 MHz.

The coefficient size field and the codebook information field as employed in the IEEE 802.11n specification is combined into 2 bits. The transmit antenna selection bit indicates which of the one or more TX antennae is or are chosen for each respective cluster (e.g., considering up to 8 TX antennae in one embodiment).

FIG. 18B is a diagram illustrating an embodiment of a field following the antenna selection bit, when set, within the MIMO control field of FIG. 18A.

If the antenna selection bit is set (e.g., B15 is set), a TX antenna selection for cluster field follows the antenna selection bit. Generally speaking, any desired size of the TX antenna selection for cluster field may be employed without departing from the scope and spirit of the invention; this embodiment shows one octet being used, though any other desired size may alternatively be employed.

FIG. 19 is a diagram illustrating an embodiment of subfields of the MIMO control field of FIG. 18A. These various subfields may be employed for describing all three formats (e.g., CSI, non-compressed, or compressed beamforming matrix). As can be seen, the grouping, coefficient size, remaining matrix segment, and time stamp are the same as in the IEEE 802.11n specification (Draft 11: Table 7-25c).

As can be seen, the Nc index indicates the maximum of the numbers of columns in matrices for all clusters less one. The Nr index indicates the number of rows in matrices for all clusters less one.

For OFDMA, the MIMO control channel cluster field indicates the cluster number in which measurement is made. This may be set as follows:

Set to 0 for Cluster 1 (lowest carrier)
Set to 1 for Cluster 2 ($2^{nd}$ lowest carrier)
Set to 2 for Cluster 3 ($2^{nd}$ largest carrier)
Set to 3 for Cluster 4 (largest carrier)

For channel bonding, the MIMO control channel cluster field indicates the bandwidth as follows:

Set to 0 for 20 MHz
Set to 1 for 40 MHz
Set to 2 for 80 MHz
3 is reserved The antenna selection bit may be set to 1 if antenna selection is chosen and to 0, otherwise.

Each bit of the TX antenna selection for the cluster indicates the selection of corresponding TX antenna. The bit k is for TX antenna number k+1.

FIG. 20 is a diagram illustrating an embodiment of a channel/state information (CSI) report field. As can be seen, the respective SNR with respect to each of the RX chains within the receiving wireless communication device may be reported (shown as each using 8 bits respectively). Generally, Nr chains are shown as being reported, where Nr, again, corresponds to the number of rows in the beamforming matrix. The beamforming CSI matrices, each being a respective H, for each of the various tones (or carriers) may also be included within the beamforming feedback frame. With respect to the diagram, considering some examples, x would 28 for a cluster or channel of 20 MHz bandwidth, 56 for a cluster or channel of 40 MHz bandwidth, and 112 for a cluster or channel of 80 MHz such as when cluster or channel bonding is employed (e.g., bonding two tones (carriers) considered together). Of course, channel bonding may not be performed in this and other embodiments when the corresponding increase in overhead may accommodated while still providing acceptable performance in a particular embodiment or application. In other words, a per tone (or per carrier) implementation may be employed in this as well as other embodiments.

The format of this CSI report field has similarity as within the IEEE 802.11n specification (Draft 11, Table 7-25d). Nb is the number of bits for each component of the beamforming CSI matrix, H.

FIG. 21 is a diagram illustrating an alternative embodiment of a CSI report field. This embodiment involves providing a CSI feedback report for each of the respective tones (or carriers). Again, considering some examples, x would 28 for a cluster or channel of 20 MHz bandwidth, 56 for a cluster or channel of 40 MHz bandwidth, and 112 for a cluster or channel of 80 MHz.

FIG. 22 is a diagram illustrating an embodiment of a beamforming feedback report for one of the respective tones (or carriers) or group of tones (carriers) as may be employed in accordance with a CSI report field. Information corresponding to the SNR within each respective tone (or carrier) within each respective RX chain can be included within the beamforming feedback frame. In addition, the entire CSI feedback matrix, H, for the respective tone (carrier), k, may also be reported. Analogous information for each of the other tones (carriers) may be included as depicted within this table for tone (carrier), k.

FIG. 23 is a diagram illustrating an embodiment of a non-compressed beamforming feedback report field. As can be seen, the respective SNR with respect to each space time stream (STS) via which the sounding frame is received from the transmitting wireless communication device may be reported. Appropriate complex multiplication may be made by the transmitting wireless communication device (beamformer) based on the beamforming feedback frame received from the receiving wireless communication device (beamformee).

Thereafter, the beamforming feedback matrix V for each respective tone (carrier) may be included within the beamforming feedback frame. Again, as within other embodiments, with respect to this diagram, considering some examples, x would 28 for a cluster or channel of 20 MHz bandwidth, 56 for a cluster or channel of 40 MHz bandwidth, and 112 for a cluster or channel of 80 MHz such as when cluster or channel bonding is employed (e.g., bonding two tones (carriers) considered together).

The format of this non-compressed beamforming feedback report field has similarity as within the IEEE 802.11n specification (Draft 11, Table 7-25g). In this embodiment, Nb is the number of bits for each component of the beamforming feedback matrix V.

FIG. 24 is a diagram illustrating an alternative embodiment of a non-compressed beamforming feedback report field. This embodiment involves providing a beamforming feedback report for each of the respective tones (or carriers). Again, considering some examples, x would 28 for a cluster or channel of 20 MHz bandwidth, 56 for a cluster or channel of 40 MHz bandwidth, and 112 for a cluster or channel of 80 MHz such as when cluster or channel bonding is employed (e.g., bonding two tones (carriers) considered together).

FIG. 25 is a diagram illustrating an embodiment of a beamforming feedback report for one of the respective tones (or carriers) or group of tones (carriers) as may be employed in accordance with a non-compressed beamforming feedback report field.

Information corresponding to the respective SNRs within each respective STS for each respective tone (or carrier) can be included within the beamforming feedback frame. This diagram shows only one particular tone (carrier), being k. In addition, the entire beamforming feedback matrix V for the respective tone (carrier), k, may also be reported. Analogous information for each of the other tones (carriers) may be included as depicted within this table for tone (carrier), k.

FIG. 26 is a diagram illustrating an embodiment of a compressed beamforming feedback report field. The format of this compressed beamforming feedback report field has similarity as within the IEEE 802.11n specification (Draft 11, Table 7-25k).

In this embodiment, $b_\psi$ is the number of bits for $\psi$ and $b_\phi$, is the number of bits for $\phi$; $\psi$ and $\phi$ are directional angles as employed for performing beamforming for use in communications between a transmitting wireless communication device and a receiving wireless communication device.

When comparing the compressed beamforming feedback report field to the non-compressed beamforming feedback report field, the compressed beamforming feedback report field instead includes the actual angles within the beamforming feedback frame that may be employed by a transmitting wireless communication device for determining one or more beamforming parameters for use in effectuating subsequent communications to the receiving wireless communication device. Considered another way, the compressed beamforming feedback report field operates by including the respective angles for use in beamforming. When operating in accordance with the non-compressed beamforming feedback report field, the transmitting wireless communication device may perform calculations to generate these angles for use in beamforming based on a beamforming feedback frame received from the receiving wireless communication device.

As can be seen, the respective SNR with respect to each space time stream (STS) via which the sounding frame is received from the transmitting wireless communication device may be reported.

Thereafter, the beamforming feedback matrix V for each respective STS may be included within the beamforming feedback frame. Again, as within other embodiments, with respect to this diagram, considering some examples, x would 28 for a cluster or channel of 20 MHz bandwidth, 56 for a cluster or channel of 40 MHz bandwidth, and 112 for a cluster or channel of 80 MHz.

FIG. 27 is a diagram illustrating an alternative embodiment of a compressed beamforming feedback report field. This embodiment involves providing a beamforming feedback report for each of the respective tones (or carriers) or group of tones (carriers). Again, considering some examples, x would 28 for a cluster or channel of 20 MHz bandwidth, 56 for a cluster or channel of 40 MHz bandwidth, and 112 for a cluster or channel of 80 MHz such as when cluster or channel bonding is employed (e.g., bonding two tones (carriers) considered together).

FIG. 28 is a diagram illustrating an embodiment of a beamforming feedback report for one of the respective tones (or carriers) or group of tones (carriers) as may be employed in accordance with a compressed beamforming feedback report field.

Information corresponding to the respective SNRs within each respective STS for each respective tone (or carrier) can be included within the beamforming feedback frame. This diagram shows only one particular tone (carrier), being k. In addition, the entire beamforming feedback matrix V for the respective tone (carrier), k, may also be reported. Analogous information for each of the other tones (carriers) may be included as depicted within this table for tone (carrier), k.

FIG. 29 is a diagram illustrating an embodiment of an ordering of angles in accordance with a compressed beamforming matrix field. This embodiment corresponds to the situation where the number of rows of the beamforming feedback matrix includes 6 rows (e.g., Nr=6).

For those instances in which the beamforming feedback matrix corresponding to the wireless communication device includes four or fewer rows (e.g., Nr≤4), the format of this table may be the same as described in IEEE 802.11n specification (Draft 11, Table 7-25i). Also, for such embodiments, the quantization of the angles may be the same as described in IEEE 802.11n specification (Draft 11, Table 7-25j).

FIG. 30 is a diagram illustrating an alternative embodiment of an ordering of angles in accordance with a compressed beamforming matrix field. This embodiment corresponds to the situation where the number of rows of the beamforming feedback matrix includes 8 rows (e.g., Nr=8).

FIG. 31A and FIG. 31B are diagrams illustrating various embodiments of methods for operating one or more wireless communication devices.

Referring to method 3100 of FIG. 31A, the method 3100 describes operations as may be performed within a transmitting wireless communication device. The method 3100 begins by employing at least one of a plurality of antennae for receiving a sounding frame transmitted from transmitting wireless communication device via a communication channel using at least one of a plurality of clusters, as shown in a block 3110.

The method 3100 continues by processing the sounding frame thereby determining a beamforming feedback frame type, as shown in a block 3120.

The method 3100 then operates by generating a beamforming feedback frame having the determined beamforming feedback frame type, indicating the first wireless communication device, and indicating certain characteristics of the communication channel, as shown in a block 3130. Examples of some of the possible characteristics corresponding to the communication channel may relate to one or more clusters being reported within the beamforming feedback frame, as well as a correspondence between the one or more clusters and their respective association with one or more antennae of the wireless communication device being reported within the beamforming feedback frame.

Some examples of possible characteristics corresponding to the communication channel include and relate to an average signal to noise ratio (SNR) within one or more receive chains of the receiving wireless communication device wireless communication device when processing the sounding frame. Another possible characteristic corresponding to the communication channel relates to an average SNR corresponding to one or more of the respective tones within the receive chain of the receiving wireless communication device wireless communication device when processing the sounding frame.

Other such examples of possible characteristics corresponding to the communication channel include and relate to an average SNR of a space time stream (STS) by which the sounding frame is transmitted from the transmitting wireless communication device to the receiving wireless communication device. Yet another possible characteristic corresponding to the communication channel relates to an average SNR corresponding to one or more tones (carriers) of the STS by which the sounding frame is transmitted from the transmitting wireless communication device to the receiving wireless communication device.

The method 3100 continues by transmitting the beamforming feedback frame to the transmitting wireless communication device, as shown in a block 3140.

In some embodiments, the one or more antennae employed for transmitting the beamforming feedback frame from the receiving wireless communication device back to the transmitting wireless communication device are the same one or more antennae employed to receive the sounding frame from the transmitting wireless communication device. However, they need not be, as the novel beamforming feedback frame format as presented herein allows for different configurability of the RX/TX antennae when receiving a sounding frame and when transmitting a beamforming feedback frame.

Analogously, in some embodiments, the one or more clusters employed for transmitting the beamforming feedback frame from the receiving wireless communication device back to the transmitting wireless communication device are the same one or more clusters on which the sounding frame has been received from the transmitting wireless communication device. However, they need not be, as the novel beamforming feedback frame format as presented herein allows for different configurability of clusters to be employed and reported in accordance with receipt and transmission of signals (and as may be reported within a beamforming feedback frame)

Referring to method 3101 of FIG. 31B, the method 3101 describes operations as may be performed within a transmitting wireless communication device. The method 3101 begins by receiving a beamforming feedback frame, as shown in a block 3111.

The method 3101 then operates by determining a beamforming parameter based on the beamforming feedback frame, as shown in a block 3121.

The method 3101 continues by in accordance with the beamforming parameter, transmitting a multi-user packet to the first wireless communication device, as shown in a block 3131. Any of a variety of types of multi-user packets may be employed including multiple input multiple output (MU-MIMO) packets, orthogonal frequency division multiple access (OFDMA) packets, and/or combination MU-MIMO/OFDMA packets.

In some of the embodiments presented herein, the transmitting wireless communication device is an access point (AP), and the one or more receiving wireless communication devices are wireless stations (STAs). However, such functionality as described herein is also applicable and may be employed with respect to communications between STAs.

It is noted that the various modules, circuitries, functional blocks, etc. (e.g., for encoding, for decoding, for baseband processing, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

Appendix A

The following compressed beamforming matrix decomposition allows for extension and adaptation to communication system applications employing one or more wireless communication devices having any desired number of antennae. Generally speaking, this compressed beamforming matrix decomposition may be extended to any dimension, N.

Compressed beamforming matrix decomposition:

$$V = \left[ \prod_{i=1}^{min(N_c, N_r-1)} \left[ D_i \begin{pmatrix} 1_{i-1} & e^{j\phi_{i,i}} & \ldots & e^{j\phi_{N_r-1,i}} & 1 \end{pmatrix} \prod_{l=i+1}^{N_r} G_{li}^T(\psi_{il}) \right] \right] \times$$

$$\tilde{I}_{N_r \times N_c} D_i \begin{pmatrix} 1_{i-1} & e^{j\phi_{i,i}} & \ldots & e^{j\phi_{N_r-1,i}} & 1 \end{pmatrix}$$

is an $N_r \times N_r$ diagonal matrix, where $1_{i-1}$ represents a sequence of ones (1s) with length i−1.

$$G_{li}(\psi) = \begin{bmatrix} I_{i-1} & 0 & 0 & 0 & 0 \\ 0 & \cos\psi & 0 & \sin\psi & 0 \\ 0 & 0 & I_{l-i-1} & 0 & 0 \\ 0 & -\sin\psi & 0 & \cos\psi & 0 \\ 0 & 0 & 0 & 0 & I_{N_r-l} \end{bmatrix}$$

sin(·) and cos(·) are located at $l^{th}$ and $i^{th}$ rows and columns.

$\tilde{I}_{N_r \times N_c}$ is an identity matrix padded with zeros to fill the additional rows or columns when $N_r \neq N_c$.

Appendix B

Mode Selection Tables:

TABLE 1

2.4 GHz, 20/22 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1
PSD Mask 1

| Frequency Offset | dBr |
|---|---|
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |

TABLE 5-continued

Channelization for Table 4

| Channel | Frequency (MHz) | Country | Channel | Frequency (MHz) | Country |
|---|---|---|---|---|---|
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Mod-ulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Mod-ulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10
PSD Mask 2

| Frequency Offset | dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. A wireless communication device comprising:
a communication interface; and
a processor configured to:
receive, via the communication interface, a beamforming feedback frame from a first other wireless communication device;
generate a multiple user (MU) beamformed frame based on information included within the beamforming feedback frame that characterizes a communication pathway between the wireless communication device and the first other wireless communication device, wherein the MU beamformed frame includes data for both the first other wireless communication device and a second other wireless communication device and includes no beamforming based on another communication pathway between the wireless communication device and the second other wireless communication device; and
transmit, via the communication interface, the MU beamformed frame to the first other wireless communication device and the second other wireless communication device.

2. The wireless communication device of claim 1, wherein the processor is further configured to:
receive another beamforming feedback frame from the second other wireless communication device;
generate another MU beamformed frame based on other information included within the another beamforming feedback frame that characterizes the another communication pathway between the wireless communication device and the second other wireless communication device, wherein the another MU beamformed frame includes other data for both the first other wireless communication device and the second other wireless communication device; and
transmit the another MU beamformed frame to the first other wireless communication device and the second other wireless communication device.

3. The wireless communication device of claim 1, wherein the processor is further configured to:
generate a sounding frame; and
transmit the sounding frame to at least one of the first other wireless communication device or the second other wireless communication device, wherein the beamforming feedback frame is based on the sounding frame.

4. The wireless communication device of claim 1, wherein the processor is further configured to:
receive the beamforming feedback frame from the first other wireless communication device via a first one or more clusters, wherein the first one or more clusters is a first mapping of orthogonal frequency division multiplexing (OFDM) tones within one or more channels among one or more frequency bands; and
transmit the MU beamformed frame to the first other wireless communication device and the second other wireless communication device via a second one or more clusters, wherein the second one or more clusters is a second mapping of OFDM tones within the one or more channels among the one or more frequency bands.

5. The wireless communication device of claim 1, wherein the processor is further configured to:
generate a sounding frame;
transmit the sounding frame to at least one of the first other wireless communication device or the second other wireless communication device via a first one or more clusters, wherein the first one or more clusters is a first mapping of orthogonal frequency division multiplexing (OFDM) tones within one or more channels among one or more frequency bands; and
receive the beamforming feedback frame from the first other wireless communication device via a second one or more clusters, wherein the second one or more clusters is a second mapping of OFDM tones within the one or more channels among the one or more frequency bands.

6. The wireless communication device of claim 1, wherein the processor is further configured to:
determine a relationship between one or more clusters and one or more antennae reported in the beamforming feedback frame, wherein the one or more clusters is a mapping of orthogonal frequency division multiplexing (OFDM) tones within one or more channels among one or more frequency bands.

7. The wireless communication device of claim 1, wherein the processor is further configured to:
transmit, via the communication interface, the MU beamformed frame to the first other wireless communication device and the second other wireless communication device as at least one of a multi-user multiple-input-multiple-output (MU-MIMO) frame or an orthogonal frequency division multiple access (OFDMA) frame.

8. The wireless communication device of claim 1 further comprising:
an access point (AP), wherein at least one of the first other wireless communication device or the second other wireless communication device is a wireless station (STA).

9. A wireless communication device comprising:
a communication interface; and
a processor configured to:
  generate a sounding frame;
  transmit, via the communication interface, the sounding frame to at least one of a first other wireless communication device or a second other wireless communication device;
  receive, via the communication interface, a beamforming feedback frame from the first other wireless communication device, wherein the beamforming feedback frame is based on the sounding frame;
  generate a multiple user (MU) beamformed frame, which includes data for both the first other wireless communication device and the second other wireless communication device, based on the beamforming feedback frame and includes no beamforming based on any feedback from the second other wireless communication device; and
  transmit, via the communication interface, the MU beamformed frame, which is at least one of a multi-user multiple-input-multiple-output (MU-MIMO) frame or an orthogonal frequency division multiple access (OFDMA) frame, to the first other wireless communication device and the second other wireless communication device.

10. The wireless communication device of claim 9, wherein the processor is further configured to:
  receive another beamforming feedback frame from the second other wireless communication device;
  generate another MU beamformed frame, which includes other data for both the first other wireless communication device and the second other wireless communication device, based on the another beamforming feedback frame; and
  transmit the another MU beamformed frame to the first other wireless communication device and the second other wireless communication device.

11. The wireless communication device of claim 9, wherein the processor is further configured to:
  receive the beamforming feedback frame from the first other wireless communication device via a first one or more clusters, wherein the first one or more clusters is a first mapping of orthogonal frequency division multiplexing (OFDM) tones within one or more channels among one or more frequency bands; and
  transmit the MU beamformed frame to the first other wireless communication device and the second other wireless communication device via a second one or more clusters, wherein the second one or more clusters is a second mapping of OFDM tones within the one or more channels among the one or more frequency bands.

12. The wireless communication device of claim 9, wherein the processor is further configured to:
  transmit the sounding frame to at least one of the first other wireless communication device or the second other wireless communication device via a first one or more clusters, wherein the first one or more clusters is a first mapping of orthogonal frequency division multiplexing (OFDM) tones within one or more channels among one or more frequency bands; and
  receive the beamforming feedback frame from the first other wireless communication device via a second one or more clusters, wherein the second one or more clusters is a second mapping of OFDM tones within the one or more channels among the one or more frequency bands.

13. The wireless communication device of claim 9 further comprising:
  an access point (AP), wherein at least one of the first other wireless communication device or the second other wireless communication device is a wireless station (STA).

14. A method for execution by a wireless communication device, the method comprising:
  receiving, via a communication interface of the wireless communication device, a beamforming feedback frame from a first other wireless communication device;
  generating a multiple user (MU) beamformed frame based on information included within the beamforming feedback frame that characterizes a communication pathway between wireless communication device and the first other wireless communication device, wherein the MU beamformed frame includes data for both the first other wireless communication device and a second other wireless communication device and includes no beamforming based on another communication pathway between the wireless communication device and the second other wireless communication device; and
  transmitting, via the communication interface of the wireless communication device, the MU beamformed frame to the first other wireless communication device and the second other wireless communication device.

15. The method of claim 14 further comprising:
  receiving another beamforming feedback frame from the second other wireless communication device;
  generating another MU beamformed frame based on other information included within the another beamforming feedback frame that characterizes another communication pathway between the wireless communication device and the second other wireless communication device, wherein the another MU beamformed frame includes other data for both the first other wireless communication device and the second other wireless communication device; and
  transmitting, via the communication interface of the wireless communication device, the another MU beamformed frame to the first other wireless communication device and the second other wireless communication device.

16. The method of claim 14 further comprising:
  generating a sounding frame; and
  transmitting, via the communication interface of the wireless communication device, the sounding frame to at least one of the first other wireless communication device or the second other wireless communication device, wherein the beamforming feedback frame is based on the sounding frame.

17. The method of claim 14 further comprising:
  receiving the beamforming feedback frame from the first other wireless communication device via a first one or more clusters, wherein the first one or more clusters is a first mapping of orthogonal frequency division multiplexing (OFDM) tones within one or more channels among one or more frequency bands; and
  transmitting the MU beamformed frame to the first other wireless communication device and the second other wireless communication device via a second one or more clusters, wherein the second one or more clusters is a second mapping of OFDM tones within the one or more channels among the one or more frequency bands.

18. The method of claim 14 further comprising:
generating a sounding frame;
transmitting, via the communication interface of the wireless communication device, the sounding frame to at least one of the first other wireless communication device or the second other wireless communication device via a first one or more clusters, wherein the first one or more clusters is a first mapping of orthogonal frequency division multiplexing (OFDM) tones within one or more channels among one or more frequency bands; and
receiving the beamforming feedback frame from the first other wireless communication device via a second one or more clusters, wherein the second one or more clusters is a second mapping of OFDM tones within the one or more channels among the one or more frequency bands.

19. The method of claim 14 further comprising:
determining a relationship between one or more clusters and one or more antennae reported in the beamforming feedback frame, wherein the one or more clusters is a mapping of orthogonal frequency division multiplexing (OFDM) tones within one or more channels among one or more frequency bands.

20. The method of claim 14, wherein the wireless communication device is an access point (AP), and at least one of the first other wireless communication device or the second other wireless communication device is a wireless station (STA).

* * * * *